United States Patent
Kawai et al.

(10) Patent No.: US 9,951,167 B2
(45) Date of Patent: Apr. 24, 2018

(54) METHOD FOR PRODUCING MODIFIED CONJUGATED DIENE POLYMER, MODIFIED CONJUGATED DIENE POLYMER, POLYMER COMPOSITION, CROSSLINKED POLYMER, AND TIRE

(71) Applicant: JSR CORPORATION, Minato-ku (JP)

(72) Inventors: Takahiro Kawai, Minato-ku (JP); Hiroyuki Morita, Minato-ku (JP); Takeshi Yuasa, Minato-ku (JP); Koichiro Tani, Minato-ku (JP); Koji Okada, Minato-ku (JP); Ryoji Tanaka, Minato-ku (JP); Masahiro Shibata, Minato-ku (JP); Shigeru Abe, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 86 days.

(21) Appl. No.: 14/415,860

(22) PCT Filed: Jul. 18, 2013

(86) PCT No.: PCT/JP2013/069506
§ 371 (c)(1),
(2) Date: Jan. 20, 2015

(87) PCT Pub. No.: WO2014/014052
PCT Pub. Date: Jan. 23, 2014

(65) Prior Publication Data
US 2015/0183914 A1    Jul. 2, 2015

(30) Foreign Application Priority Data

Jul. 20, 2012   (JP) .................................. 2012-161858
Jul. 25, 2012   (JP) .................................. 2012-164844

(51) Int. Cl.
| | | |
|---|---|---|
| *C08F 236/10* | (2006.01) | |
| *C08C 19/25* | (2006.01) | |
| *C08C 19/00* | (2006.01) | |
| *C08K 3/36* | (2006.01) | |
| *B60C 1/00* | (2006.01) | |
| *C08C 19/44* | (2006.01) | |
| *C08F 297/04* | (2006.01) | |
| *C08L 9/06* | (2006.01) | |
| *C08C 19/22* | (2006.01) | |

(52) U.S. Cl.
CPC .......... *C08F 236/10* (2013.01); *B60C 1/0016* (2013.01); *B60C 1/0025* (2013.01); *C08C 19/00* (2013.01); *C08C 19/22* (2013.01); *C08C 19/25* (2013.01); *C08C 19/44* (2013.01); *C08F 297/04* (2013.01); *C08K 3/36* (2013.01); *C08L 9/06* (2013.01)

(58) Field of Classification Search
CPC ...................................................... C08C 19/25
See application file for complete search history.

(56) References Cited

U.S. PATENT DOCUMENTS

| | | |
|---|---|---|
| 4,957,976 A | 9/1990 | Takao et al. |
| 5,015,692 A | 5/1991 | Takao et al. |
| 6,521,698 B2 * | 2/2003 | Scholl ..................... C08C 19/20 524/572 |
| 2001/0031821 A1 | 10/2001 | Scholl et al. |
| 2006/0161015 A1 | 7/2006 | Klockmann et al. |
| 2008/0103287 A1 | 5/2008 | Chino et al. |
| 2009/0247696 A1 | 10/2009 | Fujii et al. |
| 2009/0292044 A1 | 11/2009 | Kawazura et al. |
| 2011/0207879 A1 | 8/2011 | Ito et al. |
| 2012/0172528 A1 | 7/2012 | Cheng et al. |
| 2012/0270997 A1 | 10/2012 | Tanaka et al. |
| 2013/0085228 A1 | 4/2013 | Tanaka et al. |
| 2013/0245192 A1 | 9/2013 | Tanaka et al. |
| 2013/0296481 A1 | 11/2013 | Tanaka et al. |

FOREIGN PATENT DOCUMENTS

| | | |
|---|---|---|
| CN | 101177506 A | 5/2008 |
| EP | 0 270 071 A3 | 6/1988 |
| EP | 1 790 666 A1 | 5/2007 |

(Continued)

OTHER PUBLICATIONS

International Search Report dated Sep. 10, 2013 in PCT/JP13/069506 Filed Jul. 18, 2013.
Extended Search Report dated Apr. 26, 2016 in European Patent Application No. 13820246.0.
Office Action dated Feb. 25, 2016 in Chinese Patent Application No. 201380038713.0 (The Office Action has been previously filed, submitting English translation only).
Combined Chinese Office Action and Search Report dated Oct. 9, 2015 in Patent Application No. 201380038713.0 (with English language translation and English translation of categories of cited documents).
Office Action dated Jan. 31, 2017 in European Patent Application No. 13 820 246.0.
Office Action dated Feb. 28, 2017 in Japanese Patent Application No. 2014-525860 (with unedited computer generated English translation).

*Primary Examiner* — Vickey Nerangis
(74) *Attorney, Agent, or Firm* — Oblon, McClelland, Maier & Neustadt, L.L.P.

(57) ABSTRACT

A modified conjugated diene-based polymer is produced that is a modified product of a conjugated diene-based polymer obtained by polymerizing a conjugated diene compound, or polymerizing a conjugated diene compound and an aromatic vinyl compound, in the presence of an alkali metal compound or an alkaline-earth metal compound. The modified conjugated diene-based polymer is produced by a production method that includes a main chain modification step that reacts at least either an unsaturated bond or a functional group that is included in a terminal-modified polymer and is not situated at a terminal of the terminal-modified polymer, with a specific compound that includes a functional group that interacts with silica, the terminal-modified polymer being obtained by introducing a functional group that interacts with silica into at least one terminal of the conjugated diene-based polymer.

8 Claims, No Drawings

(56) References Cited

FOREIGN PATENT DOCUMENTS

| | | |
|---|---|---|
| JP | 53 88845 | 8/1978 |
| JP | 63 186748 | 8/1988 |
| JP | 63 215701 | 9/1988 |
| JP | 8 100034 | 4/1996 |
| JP | 2001 278986 | 10/2001 |
| JP | 2003 171418 | 6/2003 |
| JP | 2006 249069 | 9/2006 |
| JP | 2008 133437 | 6/2008 |
| JP | 2010 77386 | 4/2010 |
| JP | 2011 57946 | 3/2011 |
| JP | 2011 79978 | 4/2011 |
| JP | 2011 195802 | 10/2011 |
| WO | 2008 004686 | 1/2008 |
| WO | WO 2011/049180 A1 | 4/2011 |
| WO | WO 2011/155326 A1 | 12/2011 |
| WO | WO 2012/073880 A1 | 6/2012 |
| WO | WO 2012/096300 A1 | 7/2012 |

* cited by examiner

METHOD FOR PRODUCING MODIFIED CONJUGATED DIENE POLYMER, MODIFIED CONJUGATED DIENE POLYMER, POLYMER COMPOSITION, CROSSLINKED POLYMER, AND TIRE

TECHNICAL FIELD

The present invention relates to a method for producing a modified conjugated diene-based polymer, a modified conjugated diene-based polymer, a polymer composition, a crosslinked polymer, and a tire.

BACKGROUND ART

A conjugated diene-based rubber (e.g., styrene-butadiene copolymer) that is obtained using an emulsion polymerization method or a solution polymerization method has been known as rubber for producing an automotive tire. In recent years, an improvement in low fuel consumption performance (fuel efficiency) of automobiles has been increasingly desired, and various modified conjugated diene-based polymers have been proposed to meet such a demand. For example, a modified conjugated diene-based polymer obtained by modifying the terminal of a conjugated diene-based polymer using a compound that includes an amino group and an alkoxysilyl group has been proposed as rubber for producing an automotive tire (see Patent Document 1, for example). A modified conjugated diene-based polymer in which a silicon atom is bonded to a carbon atom that forms the main chain of the polymer, and an amino group is bonded to the silicon atom, and a modified conjugated diene-based polymer to which a benzene ring that includes an amino group is bonded, have also been proposed (see Patent Documents 2 and 3, for example).

Various additives may be added to a polymer composition used to produce an automotive tire in addition to the polymer component in order to improve various types of performance (e.g., tire strength and processability). Specifically, silica, carbon black, and the like may be added to the polymer composition in order to improve tire strength, and mineral oil, a compatibilizer, and the like may be added to the polymer composition in order to improve processability.

RELATED-ART DOCUMENT

Patent Document

Patent Document 1: Japanese Patent Application Publication (KOKAI) No. 2003-171418
Patent Document 2: Japanese Patent Application Publication (KOKAI) No. 2010-77386
Patent Document 3: Japanese Patent Application Publication (KOKAI) No. 2011-195802

SUMMARY OF THE INVENTION

Technical Problem

In view of the recent economic situation (e.g., rise in gasoline price) and environmental issues (e.g., global warming due to carbon dioxide emissions), a material that ensures more excellent low fuel consumption performance as compared with known materials has been desired as rubber for producing an automotive tire.

The low fuel consumption performance of automobiles can be improved by modifying a conjugated diene-based polymer using a compound that includes a nitrogen atom or a silicon atom. In this case, however, the processability of the polymer composition decreases due to an increase in interaction between the polymer and silica, for example. The processability of a polymer composition can be improved by adding a mineral oil, a compatibilizer, and the like to the polymer composition. In this case, however, a tire produced using the composition exhibits low abrasion resistance, for example. A polymer composition for producing a tire is required to exhibit excellent processability, and produce a tire that exhibits excellent low fuel consumption performance (low hysteresis loss properties) and excellent abrasion resistance.

The invention was conceived in view of the above problems. An object of the invention is to provide a modified conjugated diene-based polymer for producing a rubber composition that ensures excellent low fuel consumption performance when applied to automotive tires and the like, and a method for producing the same. Another object of the invention is to provide a modified conjugated diene-based polymer for producing a rubber composition that can improve the low fuel consumption performance of automobiles and the abrasion resistance of tires, and exhibits excellent processability, and a method for producing the same.

Solution to Problem

The inventors of the invention conducted extensive studies in order to achieve the above objects. As a result, the inventors found that the above objects can be achieved by a modified conjugated diene-based polymer obtained by modifying the terminal of a conjugated diene-based polymer, and modifying the main chain of the polymer using a specific compound. This finding has led to completion of the invention. Specifically, several aspects of the invention provide the following method for producing a modified conjugated diene-based polymer, modified conjugated diene-based polymer, polymer composition, crosslinked polymer, and tire.

According to one aspect of the invention, a method for producing a modified conjugated diene-based polymer produces a modified conjugated diene-based polymer that is a modified product of a conjugated diene-based polymer obtained by polymerizing a conjugated diene compound, or polymerizing a conjugated diene compound and an aromatic vinyl compound, in the presence of an alkali metal compound or an alkaline-earth metal compound, the method including a main chain modification step that reacts at least either an unsaturated bond or a functional group that is included in a terminal-modified polymer and is not situated at a terminal of the terminal-modified polymer, with a specific compound that includes a functional group that interacts with silica, the terminal-modified polymer being obtained by introducing a functional group that interacts with silica into at least one terminal of the conjugated diene-based polymer.

The method for producing a modified conjugated diene-based polymer may include a polymerization step that polymerizes a conjugated diene compound, or polymerizes a conjugated diene compound and an aromatic vinyl compound, in the presence of an alkali metal compound or an alkaline-earth metal compound to obtain a conjugated diene-based polymer having an active terminal, a terminal modification step that reacts the active terminal of the conjugated diene-based polymer with a compound (A1) that includes a functional group that interacts with silica, and a main chain modification step that reacts at least either an unsaturated bond or a functional group that is included in the conjugated diene-based polymer and is not situated at a terminal of the conjugated diene-based polymer, with a specific compound that includes a functional group that interacts with silica (hereinafter may be referred to as "first method").

The first method can produce a modified conjugated diene-based polymer that can produce a crosslinked polymer that ensures excellent low fuel consumption performance (low hysteresis loss properties) when applied to automotive tires and the like. The crosslinked polymer exhibits excellent wet skid resistance, and may suitably be applied to automotive tires and the like.

The method for producing a modified conjugated diene-based polymer may include a polymerization step that polymerizes a conjugated diene compound, or polymerizes a conjugated diene compound and an aromatic vinyl compound, in the presence of an alkali metal compound or an alkaline-earth metal compound to obtain a conjugated diene-based polymer having an active terminal, a terminal modification step that reacts the active terminal of the conjugated diene-based polymer with a compound (A1) that includes a functional group that interacts with silica, and a main chain modification step that reacts at least either an unsaturated bond or a functional group that is included in the conjugated diene-based polymer and is not situated at a terminal of the conjugated diene-based polymer, with a polymer (P) that includes a repeating unit (p) that includes at least one atom selected from the group consisting of a nitrogen atom, an oxygen atom, a phosphorus atom, and a sulfur atom (hereinafter may be referred to as "second method").

The second method can produce a modified conjugated diene-based polymer for producing a polymer composition that can produce a crosslinked polymer that ensures excellent low fuel consumption performance and excellent abrasion resistance when applied to automotive tires and the like, and exhibits excellent processability.

According to another aspect of the invention, a polymer composition includes a modified conjugated diene-based polymer obtained by the method for producing a modified conjugated diene-based polymer according to one aspect of the invention, silica, and a crosslinking agent. According to another aspect of the invention, a crosslinked polymer is obtained by crosslinking the polymer composition. According to a further aspect of the invention, a tire is produced using the crosslinked polymer as at least either a tread material or a sidewall material.

DESCRIPTION OF EMBODIMENTS

First Embodiment
[1] Method for Producing Modified Conjugated Diene-Based Polymer A method for producing a modified conjugated diene-based polymer according to a first embodiment of the invention includes a main chain modification step that reacts at least either an unsaturated bond or a functional group that is included in a terminal-modified polymer and is not situated at a terminal of the terminal-modified polymer, with a specific compound that includes a functional group that interacts with silica, the terminal-modified polymer being obtained by introducing a functional group that interacts with silica into at least one terminal of the conjugated diene-based polymer. Specific examples of the method according to the first embodiment of the invention include the following methods (1) and (2), and the like.

(1) A method for producing a modified conjugated diene-based polymer that includes a polymerization step that polymerizes a conjugated diene compound, or polymerizes a conjugated diene compound and an aromatic vinyl compound, in the presence of an alkali metal compound or an alkaline-earth metal compound to obtain a conjugated diene-based polymer having an active terminal, a terminal modification step that reacts the active terminal of the conjugated diene-based polymer with a compound (A1) that includes a functional group that interacts with silica, and a main chain modification step that reacts at least either an unsaturated bond or a functional group that is included in the conjugated diene-based polymer and is not situated at a terminal of the conjugated diene-based polymer, with a specific compound that includes a functional group that interacts with silica.

(2) A method for producing a modified conjugated diene-based polymer that includes a polymerization step that polymerizes a conjugated diene compound, or polymerizes a conjugated diene compound and an aromatic vinyl compound, in the presence of an alkali metal compound or an alkaline-earth metal compound (provided that the alkali metal compound or the alkaline-earth metal compound may be a metal amide compound) to obtain a conjugated diene-based polymer having an active terminal, and a main chain modification step that reacts at least either an unsaturated bond or a functional group that is included in the conjugated diene-based polymer and is not situated at a terminal of the conjugated diene-based polymer, with a specific compound that includes a functional group that interacts with silica.

Note that the method (1) can produce a modified conjugated diene-based polymer in which a polymerization-end terminal and a side chain of a conjugated diene-based polymer include a functional group that interacts with silica. The method (1) can produce a modified conjugated diene-based polymer in which the polymerization-initiation terminal, the polymerization-end terminal, and the side chain of the conjugated diene-based polymer include a functional group that interacts with silica when at least part of the alkali metal compound or the alkaline-earth metal compound is a metal amide compound. The method (2) can produce a modified conjugated diene-based polymer in which the polymerization-initiation terminal and the side chain of the conjugated diene-based polymer include a functional group that interacts with silica. Each step is described in detail below.

Polymerization Step

In the polymerization step, the conjugated diene compound is polymerized, or the conjugated diene compound and the aromatic vinyl compound are polymerized, to obtain the conjugated diene-based polymer having an active terminal.

Examples of the conjugated diene compound used in the polymerization step include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene, and the like. Among these, 1,3-butadiene, isoprene, and 2,3-dimethyl-1,3-butadiene may preferably be used. Note that these conjugated diene compounds may be used either alone or in combination.

Examples of the aromatic vinyl compound include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl) dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinylpyridine, diphenylethylene, a tertiary amino group-containing diphenylethylene, and the like. Examples of the tertiary amino group-containing diphenylethylene include 1-(4-N,N-dimethylaminophenyl)-1-phenylethylene and the like. Among these, styrene is particularly preferable. Note that these aromatic vinyl compounds may be used either alone or in combination.

Note that the above conjugated diene compounds and aromatic vinyl compounds have the same effect in that the conjugated diene-based polymer having an active terminal can be obtained. Therefore, conjugated diene compounds and aromatic vinyl compounds that are not used in the examples described later can also be used when implementing the invention.

The conjugated diene-based polymer obtained by the polymerization step may be a homopolymer of the conjugated diene compound, but is preferably a copolymer of the conjugated diene compound and the aromatic vinyl compound from the viewpoint of improving the strength of the resulting rubber. In particular, it is preferable that the conjugated diene-based polymer be a copolymer of 1,3-butadiene and styrene since high living properties are achieved during anionic polymerization.

When producing a copolymer of the conjugated diene compound and the aromatic vinyl compound, the aromatic vinyl compound is preferably used in a ratio of 3 to 55 mass %, and more preferably 5 to 50 mass %, based on the total amount of the conjugated diene compound and the aromatic vinyl compound used for polymerization, since the low hysteresis loss properties and the wet skid resistance are well-balanced when the copolymer is applied to a tire.

An additional monomer other than the conjugated diene compound and the aromatic vinyl compound may also be used for polymerization. Examples of the additional monomer include acrylonitrile, methyl (meth)acrylate, ethyl (meth)acrylate, hydroxyethyl (meth)acrylate, and the like. The additional monomer is preferably used in a ratio of less than 25 mass %, more preferably 15 mass % or less, and still more preferably 10 mass % or less, based on the total amount of the monomers used for polymerization.

The conjugated diene-based polymer may be produced using a monomer that includes at least the conjugated diene compound. The monomer may be polymerized using a solution polymerization method, a vapor-phase polymerization method, or a bulk polymerization method. Among these, a solution polymerization method is particularly preferable. The monomer may be polymerized in a batch-wise manner or a continuous manner.

When using the solution polymerization method, the monomer that includes the conjugated diene compound may be polymerized in an organic solvent in the presence of an initiator and an optional randomizer, for example.

At least either an alkali metal compound or an alkaline-earth metal compound may be used as the initiator. An alkali metal compound and an alkaline-earth metal compound that are normally used as an anionic polymerization initiator may be used as the alkali metal compound and the alkaline-earth metal compound. Examples of the alkali metal compound and the alkaline-earth metal compound include alkyllithiums such as methyllithium, ethyllithium, n-propyllithium, n-butyllithium, sec-butyllithium, and tert-butyllithium, 1,4-dilithiobutane, phenyllithium, stilbenelithium, naphthyllithium, naphthylsodium, naphthylpotassium, di-n-butylmagnesium, di-n-hexylmagnesium, ethoxypotassium, calcium stearate, and the like. Among these, lithium compounds are preferable.

A metal amide compound (R) obtained by mixing at least one compound among the above alkyllithiums, aromatic lithium compounds, and the like with a secondary amine compound may also be used as the alkali metal compound and the alkaline-earth metal compound used as the initiator. A functional group that interacts with silica can be introduced into the polymerization-initiation terminal of the conjugated diene-based polymer by polymerizing the monomer in the presence of the metal amide compound (R).

The term "interaction" used herein means that a covalent bond is formed between molecules, or an intermolecular force (intermolecular electromagnetic force such as ion-dipole interaction, dipole-dipole interaction, a hydrogen bond, or Van der Waals force) that is weaker than a covalent bond is formed. The term "functional group that interacts with silica" used herein refers to a group that includes at least one atom (e.g., nitrogen atom, sulfur atom, phosphorus atom, or oxygen atom) that interacts with silica.

The metal amide compound (R) is preferably a reaction product of a lithium compound (e.g., alkyllithium or aromatic lithium) and a secondary amine compound. Specific examples of the secondary amine compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinane, and the like.

When polymerizing the monomer in the presence of the metal amide compound (R), the metal amide compound (R) may be prepared by mixing the alkali metal compound or the alkaline-earth metal compound with the secondary amine compound, and added to the polymerization system. Alternatively, the alkali metal compound or the alkaline-earth metal compound, and the secondary amine compound may be added to the polymerization system, and mixed in the polymerization system to prepare the metal amide compound (R). The metal amide compound (R) is preferably used in an amount of 0.2 to 20 mmol based on 100 g of the monomer used for polymerization.

The randomizer may be used to adjust the content (vinyl content) of vinyl bonds (1,2-bond and 3,4-bond), for example. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and the like. These compounds may be used either alone or in combination.

The organic solvent used for polymerization may be an organic solvent that is inert to the reaction. Examples of the organic solvent used for polymerization include aliphatic hydrocarbons, alicyclic hydrocarbons, aromatic hydrocarbons, and the like. It is preferable to use a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. These organic solvents may be used either alone or in combination.

When using the solution polymerization method, the monomer concentration in the reaction solvent is preferably 5 to 50 mass %, and more preferably 10 to 30 mass %, from the viewpoint of maintaining the balance between productivity and polymerization controllability. The polymerization reaction temperature is preferably −20 to 150° C., more preferably 0 to 120° C., and particularly preferably 20 to 100° C. It is preferable to effect the polymerization reaction under a pressure sufficient to substantially maintain the monomer to be in a liquid phase. Such a pressure may be achieved by pressurizing the reactor using gas that is inert to the polymerization reaction, for example.

The polystyrene-reduced weight average molecular weight (Mw) of the conjugated diene-based polymer obtained by the polymerization reaction, determined by gel permeation chromatography (GPC), is preferably $1.0 \times 10^5$ to $2.0 \times 10^6$. If the Mw of the conjugated diene-based polymer is less than $1.0 \times 10^5$, the crosslinked polymer obtained using the polymer composition that includes the modified conjugated diene-based polymer may show a decrease in low fuel consumption performance and abrasion resistance. If the Mw of the conjugated diene-based polymer exceeds $2.0 \times 10^6$, the polymer composition may show a decrease in processability. The Mw of the conjugated diene-based polymer is more preferably $1.5 \times 10^5$ to $1.5 \times 10^6$, and still more preferably $2.0 \times 10^5$ to $1.0 \times 10^6$. The vinyl content in the conjugated diene-based polymer is preferably 30 to 65%, more preferably 33 to 62%, and still more preferably 35 to 60%. If the vinyl content in the conjugated diene-based polymer is less than 30%, the grip properties may decrease to a large extent. If the vinyl content in the conjugated diene-based polymer exceeds 65%, the abrasion resistance may deteriorate. Note that the vinyl content in the conjugated diene-based polymer refers to a value determined by $^1$H-NMR.

Terminal Modification Step

In the terminal modification step, the active terminal of the conjugated diene-based polymer obtained by the polymerization step is reacted with the compound (A1) that includes a functional group that interacts with silica. A functional group that interacts with silica can be introduced into the polymerization-end terminal of the conjugated diene-based polymer by performing the terminal modification step.

The polymerization-initiation terminal of the conjugated diene-based polymer subjected to the modification reaction (hereinafter may be referred to as "terminal modification reaction") in the terminal modification step may be unmodified, or may have been modified, as long as the conjugated diene-based polymer has the active terminal. A compound that includes a functional group that interacts with silica, and can react with the polymerization active terminal is used as the compound (A1). Specifically, at least one compound selected from the group consisting of the following compounds (a-1) to (a-3) is used as the compound (A1).

(I) Compound (a-1) represented by the following formula (1)

(1)

wherein $A^1$ is a monovalent functional group that includes at least one atom selected from the group consisting of a nitrogen atom, a phosphorus atom, and a sulfur atom, and does not include active hydrogen, the monovalent functional group being bonded to $R^3$ through a nitrogen atom, a phosphorus atom, or a sulfur atom, $R^1$ and $R^2$ are a hydrocarbyl group, $R^3$ is a hydrocarbylene group, and n is an integer from 0 to 2, provided that a plurality of $R^1$ are either identical or different when a plurality of $R^1$ are present, and a plurality of $R^2$ are either identical or different when a plurality of $R^2$ are present.

(II) Compound (a-2) that includes a functional group (x1) and a group (x2) in its molecule, the functional group (x1) being at least one functional group selected from the group consisting of a cyclic ether group and a (thio)carbonyl group, and the group (x2) including at least one atom selected from the group consisting of a nitrogen atom, a phosphorus atom, an oxygen atom, and a sulfur atom, and not including active hydrogen, the group (x2) differing from the functional group (x1)

(III) Compound (a-3) that Includes Two or More Iso(Thio)Cyanate Groups in its Molecule Note that the term "(thio)carbonyl group" used herein refers to "carbonyl group" and "thiocarbonyl group". The term "iso(thio)cyanate group" used herein refers to "isocyanate group" and "isothiocyanate group".

Compound (a-1)

The hydrocarbyl group represented by $R^1$ and $R^2$ in the formula (1) is preferably a linear or branched alkyl group having 1 to 20 carbon atoms, a cycloalkyl group having 3 to 20 carbon atoms, or an aryl group having 6 to 20 carbon atoms.

$R^3$ is preferably a linear or branched alkanediyl group having 1 to 20 carbon atoms, a cycloalkylene group having 3 to 20 carbon atoms, or an arylene group having 6 to 20 carbon atoms.

It is preferable that n be 0 or 1 from the viewpoint of improving the reactivity with the conjugated diene-based polymer.

$A^1$ includes at least one atom selected from the group consisting of a nitrogen atom, a phosphorus atom, and a sulfur atom (hereinafter may be referred to as "specific atom"), and is bonded to $R^3$ through the specific atom. The specific atom is not bonded to active hydrogen. The specific atom may be protected by a trisubstituted hydrocarbylsilyl group or the like, for example. Note that the term "active hydrogen" used herein refers to a hydrogen atom that is bonded to an atom other than a carbon atom, and preferably refers to a hydrogen atom that has a bonding energy lower than that of the carbon-hydrogen bond of polymethylene.

It is preferable that $A^1$ be a group that may produce an onium ion due to an onium salt generator. When the compound (a-1) includes such a group (A1), it is possible to provide the modified conjugated diene-based polymer with an excellent shape retention capability.

Specific examples of $A^1$ include a nitrogen-containing group in which two hydrogen atoms of a primary amino group are substituted with two protecting groups, a nitrogen-containing group in which one hydrogen atom of a secondary amino group is substituted with one protecting group, a tertiary amino group, an imino group, a pyridyl group, a phosphorus-containing group in which two hydrogen atoms of a primary phosphino group are substituted with two protecting groups, a phosphorus-containing group in which one hydrogen atom of a secondary phosphino group is substituted with one protecting group, a tertiary phosphino group, a sulfur-containing group in which one hydrogen atom of a thiol group is substituted with one protecting group, and the like. It is preferable that $A^1$ be a group that includes a nitrogen atom from the viewpoint of affinity to silica. Note that the term "protecting group" used herein in connection with $A^1$ refers to a functional group that converts $A^1$ into an inactive functional group. Examples of the protecting group include a trisubstituted hydrocarbylsilyl group and the like.

Specific examples of the compound (a-1) that includes a nitrogen-containing group in which two hydrogen atoms of a primary amino group are substituted with two protecting groups, a nitrogen-containing group in which one hydrogen atom of a secondary amino group is substituted with one protecting group, or a tertiary amino group, and an alkoxysilyl group, include N,N-bis(trimethylsilyl)aminopropyltrimethoxysilane, N,N-bis(trimethylsilyl)aminopropylmethyldiethoxysilane, N,N',N'-tris(trimethylsilyl)-N-(2-aminoethyl)-3-aminopropyltriethoxysilane, 1-(3-triethoxysilylpropyl)-2,2,5,5-tetramethyl-1-aza-2,5-disilacyclopentane, 1-trimethylsilyl-2,2-dimethoxy-1-aza-2-silacyclopentane, N-[3-(trimethoxysilyl)-propyl]-N,N'-diethyl-n'-trimethylsilyl-ethane-1,2-diamine, N-[3-(methyldimethoxysilyl)-propyl]-N,N'-diethyl-N'-trimethylsilyl-p-phenylenediamine, 3-[3-(trimethylsilylethylamino)-1-pyrrolidinyl]propylmethyldiethoxysilane, N-[3-(diethoxymethylsilyl)-propyl]-N-ethyl-N'-(2-ethoxyethyl)-N'-trimethylsilylethane-1,2-diamine, 3-(4-trimethylsilyl-1-piperazino)propylmethyldimethoxysilane, N-trimethylsilyl-n-methylaminopropylmethyldiethoxysilane, 3-(4-trimethylsilyl-1-piperazino)propyltriethoxysilane, N-[2-(trimethoxysilyl)ethyl]-N,N',N'-trimethylethane-1,2-diamine, 1-[3-(triethoxysilyl)propyl]-4-methylpiperazine, 1-[3-(triethoxysilyl)propyl]-3-methylimidazolidine, 2-(3-trimethoxysilylpropyl)-1,3-dimethylimidazolidine, 1-[3-(triethoxysilyl)propyl]-3-methylhexahydropyrimidine, 3-[3-(tributoxysilyl)-propyl]-1-methyl-1,2,3,4-tetrahydropyrimidine, 1-(2-ethoxyethyl)-3-[3-(trimethoxysilyl)propyl]-imidazolidine, 2-{3-[3-(trimethoxysilyl)propyl]-tetrahydropyrimidin-1-yl}-ethyldimethylamine, 2-(trimethoxysilyl)-1,3-dimethylimidazolidine, 2-(triethoxysilyl)-1,4-diethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(3-ethyldimethoxysilyl-propyl)imidazolidin-1-yl]ethyldimethylamine, 5-(3-trimethoxysilyl-propyl)-1,3-bis(2-methoxyethyl)hexahydropyrimidine, 3-dimethylaminopropyltrimethoxysilane, 3-dimethylaminopropylmethyldimethoxysilane, 3-morpholinopropylmethyldimethoxysilane, 3-piperidinopropyltrimethoxysilane, 3-piperidinopropylmethyldimethoxysilane, bis[3-(triethoxysilyl)propyl]trimethylsilylamine, compounds obtained by substituting the alkyl group or the alkanediyl group included in these compounds with an alkyl group or an alkanediyl group having 1 to 6 carbon atoms, and the like.

Among these, n,n-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-n-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilylethane-1,2-diamine, N-[3-(triethoxysilyl)propyl]-N,N'-diethyl-N'-trimethylsilylethane-1,2-diamine, N-trimethylsilyl-N-methylaminopropylmethyldiethoxysilane, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine, bis[3-(trimethoxysilyl)propyl]trimethylsilylamine, and the like are preferable.

Specific examples of the compound (a-1) that includes an imino group or a pyridyl group, and an alkoxysilyl group, include N-(1,3-dimethylbutylidene)-3-(triethoxysilyl)-1-propanamine, n-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, trimethoxysilyl compounds, methyldiethoxysilyl compounds, and ethyldimethoxysilyl compounds corresponding to these triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, compounds obtained by substituting the alkyl group or the alkanediyl group included in these compounds with an alkyl group or an alkanediyl group having 1 to 6 carbon atoms, and the like.

Among these, N-(1,3-dimethylbutylidene)-3-(triethoxysilyl)-1-propanamine, N-(1-methylpropylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, and the like are preferable.

Specific examples of the compound (a-1) that includes a phosphorus-containing group in which two hydrogen atoms of a primary phosphino group are substituted with two protecting groups, a phosphorus-containing group in which one hydrogen atom of a secondary phosphino group is substituted with one protecting group, a tertiary phosphino group, or a sulfur-containing group in which one hydrogen atom of a thiol group is substituted with one protecting group, and an alkoxysilyl group, include P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphospinopropylmethyldimethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, compounds obtained by substituting the alkyl group or the alkanediyl group included in these compounds with an alkyl group or an alkanediyl group having 1 to 6 carbon atoms, and the like.

Among these, 3-diphenylphospinopropyltrimethoxysilane, 3-diphenylphospinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the like are preferable.

Further examples of the compound (a-1) include compounds that include an iso(thio)cyanate group, such as 3-isocyanatopropyltrimethoxysilane, 3-isocyanatopropyltriethoxysilane, and 3-isothiocyanatopropyltrimethoxysilane.

Compound (a-2)

The compound (a-2) includes the functional group (x1) and the group (x2). The cyclic ether group that may be included in the functional group (x1) is preferably a three-membered ring or a four-membered ring, and more preferably a three-membered ring. The group (x2) is preferably a trisubstituted nitrogen atom.

The nitrogen atom, the phosphorus atom, the oxygen atom, or the sulfur atom that may be included in the group (x2) included in the compound (a-2) may be bonded directly to the functional group (x1), or may be bonded to the functional group (x1) through a divalent organic group. Examples of the divalent organic group include hydrocarbylene groups having 1 to 30 carbon atoms, and the like.

Specific examples of the compound (a-2) include compounds that include a cyclic ether group, such as epoxyamine compounds such as N,N,N',N'-tetraglycidyl-1, 3-bisaminomethylcyclohexane, N,N,N',N'-tetraglycidyl-m-xylylenediamine, N,N,N',N'-tetraglycidyl(4,4'-methylenebisaniline), N,N,N',N'-tetraglycidyl-p-phenylenediamine, and N,N-diglycidylaminomethylcyclohexane; compounds that include a (thio)carbonyl group, such as (dihydrocarbylamino)benzophenones such as 4-N,N-dimethylaminobenzophenone, 4,4'-bis(dimethylamino)benzophenone, and 4,4'-bis(diethylamino)benzophenone; 4-aminoacetophenones such as 4-N,N-dimethylaminoacetophenone and α-(1H-imidazol-1-yl)acetophenone; bis(dihydrocarbylaminoalkyl) ketones such as 1,7-bis(methylethylamino)-4-heptanone; dihydrocarbylaminoalkyl (meth)acrylates such as 2-dimethylaminoethyl acrylate, 3-dimethylaminopropyl acrylate, and 2-dimethylaminoethyl methacrylate; hydrocarbylimidazolidinones such as 1,3-dimethyl-2-imidazolidinone and 1,3-diethyl-2-imidazolidinone; N-hydrocarbylpyrrolidones such as 1-phenyl-2-pyrrolidone and 1-methyl-2-pyrrolidone; N-hydrocarbylcaprolactams such as N-methyl-ε-caprolactam and N-phenyl-ε-caprolactam; N-dihydrocarbylformamides such as N,N-diethylformamide; N,N-dihydrocarbylacetamides such as N,N-dimethylacetamide; (meth) acrylamides such as N,N-dimethylacrylamide, N,N-dimethylmethacrylamide, N,N-dimethylaminopropylacrylamide, and N,N-diethylaminopropylacrylamide; thioketones such as 4,4'-bis(dimethylamino)thiobenzophenone and 4,4'-bis(diethylamino)thiobenzophenone; and the like.

Compound (a-3)

The number of iso(thio)cyanate groups included in the compound (a-3) is 2 or more, preferably 2 to 6, and more preferably 2 to 4. The compound (a-3) may include a divalent hydrocarbylene group having 1 to 30 carbon atoms or the like as a structure other than the iso(thio)cyanate groups.

Specific examples of the compound (a-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl) thiophosphate, xylene diisocyanate, benzene-1,2,4-triisocyanate, naphthalene-1,2,5,7-tetraisocyanate, 1,4-phenylene diisothiocyanate, and the like.

Note that the above compounds (A1) have the same effect in that the modified conjugated diene-based polymer in which the polymerization-end terminal is modified with a compound that includes a functional group that interacts with silica can be obtained. Therefore, compounds (A1) that are not used in the examples described later can also be used when implementing the invention.

The compound (A1) is preferably at least one compound selected from the group consisting of the compound (a-1) and the compound (a-2), and particularly preferably the compound (a-1), since the dispersibility of silica is advantageously improved. When using the compound (a-1) as the compound (A1), silicon tetrachloride, an epoxy-containing compound (e.g., tetraglycidyl-1,3-bisaminomethylcyclohexane), or the like may be used in combination with the compound (a-1) in order to adjust the Mooney viscosity of the modified conjugated diene-based polymer.

The terminal modification reaction may be effected as a solution reaction, for example. The solution reaction may be effected directly using the solution that includes unreacted monomers after completion of the polymerization reaction effected in the polymerization step, or may be effected after isolating the conjugated diene-based polymer included in the solution, and dissolving the conjugated diene-based polymer in an appropriate solvent (e.g., cyclohexane). The terminal modification reaction may be effected in a batch-wise manner or a continuous manner. In this case, the compound (A1) may be added using an arbitrary method. For example, the compound (A1) may be added at a time, or may be added stepwise, or may be added successively.

The amount of the compound (A1) used for the terminal modification reaction may be appropriately determined taking account of the type of compound used for the reaction. The compound (A1) is preferably used in an amount of 0.1 molar equivalents or more, and more preferably 0.3 molar equivalents or more, based on the active site of the conjugated diene-based polymer. When the compound (A1) is used in an amount of 0.1 molar equivalents or more, the modification reaction proceeds sufficiently, and the dispersibility of silica can be advantageously improved. It is preferable to use the compound (A1) in an amount of 1.2 molar equivalents or less based on the active site of the conjugated diene-based polymer in order to prevent a situation in which the main chain modification step described below is hindered.

The terminal modification reaction temperature is normally set to be equal to the polymerization reaction temperature, preferably −20 to 150° C., more preferably 0 to 120° C., and particularly preferably 20 to 100° C. If the modification reaction temperature is low, the viscosity of the modified conjugated diene-based polymer may increase. If the modification reaction temperature is high, the polymerization active terminal may be easily inactivated. The terminal modification reaction time is preferably 1 minute to 5 hours, and more preferably 2 minutes to 1 hour.

Main Chain Modification Step

In the main chain modification step, at least either an unsaturated bond or a functional group (i.e., at least one of an unsaturated bond, an allylic position, and a benzylic position) that is included in the conjugated diene-based polymer obtained by the polymerization reaction and is not situated at the terminal of the polymer, is reacted with the specific compound. A functional group that interacts with silica can be introduced into the side chain of the conjugated diene-based polymer by performing the main chain modification step.

Specific Compound

In the first embodiment, the compound (A1) (i.e., the modifying agent used in the terminal modification step) is used as the specific compound when effecting the modification reaction (hereinafter may be referred to as "main chain modification reaction") in the main chain modification step. Specific examples of the specific compound include the compound (a-1), the compound (a-2), the compound (a-3), and the like. Specific examples of the compound (a-1), the compound (a-2), and the compound (a-3) include those mentioned above in connection with the compound (A1). The compounds mentioned above in connection with the compound (A1) may be used either alone or in combination as the specific compound.

The compound (a-1) is particularly preferable as the specific compound since the low hysteresis loss properties and the wet skid resistance are advantageously improved when the resulting crosslinked polymer is used for automotive tire applications.

The specific compound used when effecting the main chain modification reaction may be identical with or different from the compound (A1) used when effecting the terminal modification reaction. When using a compound identical with the compound (A1) as the specific compound, the modification reaction in the terminal modification step and the modification reaction in the main chain modification step may be effected simultaneously.

Note that the above specific compounds have the same effect in that the modified conjugated diene-based polymer in which a part that is not situated at the terminal of the polymer is modified with a compound that includes a functional group that interacts with silica can be obtained. Therefore, specific compounds that are not used in the examples described later can also be used when implementing the invention.

The structure derived from the specific compound may be introduced into the side chain of the conjugated diene-based polymer using an arbitrary method. The structure derived from the specific compound may be introduced into the side chain of the conjugated diene-based polymer by appropriately combining normal methods used in organic chemistry. For example, an active site may be formed in an unsaturated bond or a functional group that is included in the conjugated diene-based polymer obtained by the polymerization reaction and is not situated at the terminal of the polymer, and reacted with the specific compound.

More specifically, (i) the unsaturated double bond included in the structural unit that is included in the conjugated diene-based polymer and derived from the conjugated diene compound may be subjected to hydrometalation, and the conjugated diene-based polymer may be reacted with the specific compound, or (ii) at least one of the allylic position included in the structural unit that is included in the conjugated diene-based polymer and derived from the conjugated diene compound, and the benzylic position included in the structural unit that is included in the conjugated diene-based polymer and derived from the aromatic vinyl compound, may be subjected to lithiation, and the conjugated diene-based polymer may be reacted with the specific compound, for example.

When using the method (i), the conjugated diene-based polymer may be subjected to hydrometalation by reacting the conjugated diene-based polymer obtained by the polymerization step with a hydrometalation agent. A hydrogen atom and a metal atom are thus added to an unsaturated bond that is included in the conjugated diene-based polymer and is not situated at the terminal (i.e., the vinyl bond included in the structural unit derived from the conjugated diene compound).

A compound that includes a metal-hydrogen bond that bonds a metal atom (e.g., aluminum, silicon, zirconium, or tin) and a hydrogen atom may be used as the hydrometalation agent. It is preferable to use a compound that includes an aluminum-hydrogen bond. Specific examples of such a compound include lithium aluminum hydride, diisobutylaluminum hydride, and the like. The amount of the hydrometalation agent used for the reaction is not particularly limited. It is preferable to use the hydrometalation agent in such an amount that the molar equivalent of the hydrometalation agent is 0.1 to 20, and more preferably 1 to 10, based on 1 molar equivalent of the conjugated diene-based polymer.

The hydrometalation reaction may be effected as a solution reaction in the presence of an appropriate catalyst. The solution reaction may be effected directly using the solution that includes unreacted monomers after completion of the polymerization reaction, or may be effected after isolating the polymer included in the solution, and dissolving the polymer in an appropriate solvent (e.g., cyclohexane).

The hydrometalation reaction temperature is normally set to be equal to the polymerization reaction temperature, preferably −20 to 150° C., more preferably 0 to 120° C., and particularly preferably 20 to 100° C. The reaction time is preferably 1 minute to 3 hours, and more preferably 2 minutes to 1 hour.

The conjugated diene-based polymer is reacted with the specific compound preferably in a solution after completion of the hydrometalation reaction to bond the vinyl bond site (hydrometalated site) of the conjugated diene-based polymer to the functional group of the specific compound. A modified conjugated diene-based polymer that includes a functional group that interacts with silica in the side chain can thus be obtained.

When effecting the above reaction, the specific compound is preferably used in an amount of 0.1 to 10 molar equivalents, and more preferably 0.1 to 5 molar equivalents, based on 1 molar equivalent of the hydrometalation agent. The reaction temperature is normally set to be equal to the polymerization reaction temperature, preferably −20 to 150° C., more preferably 0 to 120° C., and particularly preferably 20 to 100° C. The reaction time is preferably 1 minute to 5 hours, and more preferably 2 minutes to 1 hour.

When using the method (ii), the conjugated diene-based polymer may be subjected to lithiation by reacting the conjugated diene-based polymer obtained by the polymerization step with a lithiation agent in the presence of a promoter (e.g., tetramethylethylenediamine). This reaction lithiates the allylic position of the structural unit that is included in the conjugated diene-based polymer and derived from the conjugated diene compound, or the benzylic position of the structural unit that is included in the conjugated diene-based polymer and derived from the aromatic vinyl compound.

Examples of the lithiation agent used for the reaction include methyllithium, n-butyllithium, s-butyllithium, t-butyllithium, and the like. The amount of the lithiation agent used for the reaction is not particularly limited. It is preferable to use the lithiation agent in such an amount that the molar equivalent of the lithiation agent is 0.1 to 20, and more preferably 1 to 10, based on 1 molar equivalent of the polymer.

The lithiation reaction may be effected as a solution reaction, for example. The solution reaction may be effected directly using the solution that includes unreacted monomers after completion of the polymerization reaction, or may be effected after isolating the polymer included in the solution, and dissolving the polymer in an appropriate solvent (e.g., cyclohexane).

The lithiation reaction temperature is normally set to be equal to the polymerization reaction temperature, preferably −20 to 150° C., more preferably 0 to 120° C., and particularly preferably 20 to 100° C. The reaction time is preferably 1 minute to 3 hours, and more preferably 2 to 30 minutes.

The lithiated site of the conjugated diene-based polymer is bonded to the functional group of the specific compound by reacting the conjugated diene-based polymer with the specific compound preferably in a solution after effecting the lithiation reaction. A modified conjugated diene-based polymer in which a functional group that interacts with silica branches from the main chain can thus be obtained.

When effecting the above reaction, the specific compound is preferably used in an amount of 0.1 to 10 molar equivalents, and more preferably 0.1 to 5 molar equivalents, based on 1 molar equivalent of the lithiation agent. The reaction temperature and the reaction time may be the same as those described above in connection with the hydrometalation reaction.

Note that a modified conjugated diene-based polymer of which one terminal and the main chain are modified can be obtained by subjecting the conjugated diene-based polymer of which the polymerization-initiation terminal is modified and the polymerization-end terminal is not modified, to the main chain modification reaction, or subjecting the conjugated diene-based polymer of which the polymerization-initiation terminal is not modified and the polymerization-end terminal is modified, to the main chain modification reaction. A modified conjugated diene-based polymer of which each terminal and the main chain are modified can be obtained by subjecting the conjugated diene-based polymer of which the polymerization-initiation terminal and the polymerization-end terminal are modified, to the main chain modification reaction.

When simultaneously effecting the terminal modification reaction in the terminal modification step and the main chain modification reaction in the main chain modification step, a polymer having an active terminal is obtained by the polymerization step, and an active site is formed in an unsaturated bond or a functional group that is included in the polymer and is not situated at the terminal of the polymer. The polymer is then reacted with the compound (A1) (i.e., modifying agent), for example.

Additional Step

When modifying the conjugated diene-based polymer by performing the terminal modification step, the method for producing a modified conjugated diene-based polymer according to the first embodiment of the invention may include a step that mixes the modified conjugated diene-based polymer with an onium salt generator after completion of the terminal modification step and the main chain modification step. This step introduces an onium structure into the conjugated diene-based polymer to improve the shape retention capability of the modified conjugated diene-based polymer.

Examples of the onium salt generator used in the above step include metal halide compounds such as a silicon halide compound, a tin halide compound, an aluminum halide compound, a titanium halide compound, a zirconium halide compound, a germanium halide compound, a gallium halide compound, and a zinc halide compound; esters of inorganic acids such as a sulfate, a phosphate, a carbonate, and a nitrate; inorganic acids such as hydrofluoric acid, hydrochloric acid, hydrobromic acid, hydroiodic acid, sulfuric acid, nitric acid, carbonic acid, and phosphoric acid; inorganic acid salts such as potassium fluoride, tetramethylammonium fluoride, and tetra-n-butylammonium fluoride; organic acids such as a carboxylic acid (e.g., maleic acid) and sulfonic acid; and the like.

Specific examples of a preferable onium salt generator include silicon tetrachloride, tin tetrachloride, trimethylsilyl chloride, dimethyldichlorosilane, diethylaluminum chloride, zinc chloride, titanium tetrachloride, zirconium tetrachloride, germanium tetrachloride, gallium trichloride, diethyl sulfate, trimethyl phosphate, dimethyl carbonate, maleic acid, benzenesulfonic acid, and the like.

The conjugated diene-based polymer and the onium salt generator may be mixed in a solution, for example. The onium salt generator is preferably used in an amount of 0.5 molar equivalents or more, and more preferably 1.0 molar equivalent or more, based on the active site of the conjugated diene-based polymer.

The conjugated diene-based polymer and the onium salt generator are normally mixed at a temperature equal to the polymerization reaction temperature, preferably −20 to 150° C., more preferably 0 to 120° C., and particularly preferably 20 to 100° C.

The onium salt structure is formed in the conjugated diene-based polymer in the presence of water. For example, the onium salt structure is formed in the conjugated diene-based polymer by (i) adding water and the onium salt generator directly to the solution that includes the conjugated diene-based polymer, and mixing the mixture, or (ii) adding a solution prepared by dissolving a water-soluble organic solvent (e.g., alcohol) in water, and the onium salt generator to the solution that includes the conjugated diene-based polymer, and mixing the mixture, or (iii) mixing the solution that includes the conjugated diene-based polymer with the onium salt generator, and allowing water to be present in the system by utilizing solvent removal through steam stripping. Note that it is preferable to use the method (iii).

The modified conjugated diene-based polymer included in the reaction solution may be isolated by performing a known solvent removal method (e.g., steam stripping) and a drying operation (e.g., heat treatment), for example. The Mooney viscosity of the modified conjugated diene-based polymer thus obtained may optionally be adjusted by adding an extender oil or the like. This process improves the processability of the modified conjugated diene-based polymer. Examples of the extender oil include aromatic oil, naphthenic oil, paraffinic oil, and the like. The extender oil may be used in an appropriate amount taking account of the monomer used for polymerization, and the like. For example, the extender oil is used in an amount of 10 to 50 parts by mass based on 100 parts by mass of the modified conjugated diene-based polymer.

[2] Modified Conjugated Diene-Based Polymer

The method for producing a modified conjugated diene-based polymer according to the first embodiment of the invention can produce a polymer that includes a conjugated diene-based polymer, a functional group that interacts with silica, the functional group being situated at one terminal (polymerization-initiation terminal or polymerization-end terminal) or each terminal of the conjugated diene-based polymer, and at least one structure selected from the group consisting of a structure represented by the following formula (2) and a structure represented by the following formula (3), the at least one structure being situated in a side chain of the conjugated diene-based polymer.

(2)

wherein $A^2$ is a monovalent functional group that includes at least one atom selected from the group consisting of a nitrogen atom, a phosphorus atom, and a sulfur atom, and is bonded to $R^3$ through a nitrogen atom, a phosphorus atom, or a sulfur atom, $R^1$ is a hydrocarbyl group, $R^3$ is a hydrocarbylene group, $R^4$ is a hydrogen atom or a hydrocarbyl group, n is an integer from 0 to 2, provided that a plurality of $R^1$ are either identical or different when a plurality of $R^1$ are present, and a plurality of $R^4$ are either identical or different when a plurality of $R^4$ are present, and "*" is a bonding site.

(3)

wherein $A^3$ is a divalent group that includes at least one group selected from the group consisting of a hydroxyl group, a thiol group, and a (thio)amide group, and $A^4$ is a monovalent group that includes at least one atom selected from the group consisting of a nitrogen atom, a phosphorus atom, and a sulfur atom.

Examples of $A^2$ in the formula (2) include the groups mentioned above in connection with $A^1$ in the formula (1) as the functional group that is substituted with at least one protecting group, groups obtained by deprotecting these groups (e.g., primary amino group, secondary amino group, primary phosphino group, secondary phosphino group, and thiol group), and the like. The hydrocarbyl group represented by $R^4$ is the same as described above in connection with $R^2$. $R^1$ and $R^3$ are the same as $R^1$ and $R^3$ in the formula (1). The modified conjugated diene-based polymer that includes the structure represented by the formula (2) in the side chain can be obtained by utilizing the compound (a-1) as the specific compound when implementing the method for producing a modified conjugated diene-based polymer according to the first embodiment of the invention.

The modified conjugated diene-based polymer that includes the structure represented by the formula (3) in the side chain can be obtained by utilizing the compound (a-2) or the compound (a-3) as the specific compound when implementing the method for producing a modified conjugated diene-based polymer according to the first embodiment of the invention.

Examples of $A^3$ in the formula (3) include divalent groups obtained by substituting a hydrogen atom of a hydrocarbylene group having 1 to 20 carbon atoms with a hydroxyl group or a thiol group, —CO—NH—$R^a$—, —CS—NH—$R^a$— (wherein $R^a$ is a hydrocarbylene group having 1 to 20 carbon atoms), and the like. $A^4$ is a monovalent group having a structure derived from the group (x2) of the compound (a-2) or the iso(thio)cyanate group of the compound (a-3). Examples of the monovalent group represented by $A^4$ include monovalent groups that include a nitrogen atom, a phosphorus atom, or a sulfur atom between carbon atoms of a hydrocarbyl group having 1 to 20 carbon atoms, an iso(thio)cyanate group, an amino group, and the like. Note that the term "(thio)amide group" used herein refers to "amide group" and "thioamide group".

[3] Polymer Composition
Polymer Component

A polymer composition according to the first embodiment of the invention includes a modified conjugated diene-based polymer (hereinafter may be referred to as "specific polymer") obtained by the method for producing a modified conjugated diene-based polymer according to the first embodiment of the invention.

The content of the polymer component in the polymer composition is preferably 20 mass % or more, more preferably 30 mass % or more, and particularly preferably 40 mass % or more. When the content of the polymer component is 20 mass % or more, the resulting crosslinked polymer exhibits improved mechanical properties (e.g., tensile strength and tensile elongation), crack-growth resistance, and abrasion resistance.

The polymer composition according to the first embodiment of the invention may include an additional polymer other than the specific polymer as the polymer component. Examples of the additional polymer include a natural rubber, a synthetic isoprene rubber, a butadiene rubber, a modified butadiene rubber, a styrene-butadiene rubber, a modified styrene-butadiene rubber, an ethylene-α-olefin copolymer rubber, an ethylene-α-olefin-diene copolymer rubber, an acrylonitrile-butadiene copolymer rubber, a chloroprene rubber, a halogenated butyl rubber, a styrene-isoprene copolymer rubber, a butadiene-isoprene copolymer rubber, a random styrene-butadiene-isoprene copolymer rubber, a styrene-acrylonitrile-butadiene copolymer rubber, an acrylonitrile-butadiene copolymer rubber, a polystyrene-polybutadiene-polystyrene block copolymer, mixtures thereof, and the like.

When the polymer composition includes the additional polymer as the polymer component, the content of the specific polymer in the polymer composition is preferably 5 mass % or more, more preferably 10 mass % or more, and particularly preferably 20 mass % or more, based on the total amount of the polymer component included in the polymer composition. When the content of the specific polymer is 5 mass % or more, various properties such as low hysteresis properties, abrasion resistance, and processability can be further improved.

Reinforcing Agent

The polymer composition according to the first embodiment of the invention includes silica as a reinforcing agent. Specific examples of the silica include wet process silica (hydrated silica), dry process silica (silicic anhydride), colloidal silica, precipitated silica, calcium silicate, aluminum silicate, and the like. Among these, wet process silica is particularly preferable from the viewpoint of improving fracture resistance, and achieving wet grip properties and low rolling resistance in combination. It is also preferable to use high dispersible-type silica since the dispersibility of the silica in the polymer composition can be improved while improving properties and processability. These silicas may be used either alone or in combination. The silica is preferably used in an amount of 1 to 100 parts by mass, and more preferably 5 to 95 parts by mass, based on 100 parts by mass of the polymer component in total.

The polymer composition according to the first embodiment of the invention may optionally include carbon black as the reinforcing agent in addition to the silica. Specific examples of the carbon black include furnace black (e.g., SRF, GPF, FEF, HAF, ISAF, SAF, ISAF-HS, ISAF-LS, IISAF-HS, HAF-HS, and HAF-LS), acetylene black, thermal black, channel black, graphite, graphite fibers, fullerenes, and the like. It is preferable to use carbon black having an iodine adsorption (IA) of 60 mg/g or more and a dibutyl phthalate (DBP) absorption of 80 ml/100 g or more. The grip performance and the fracture resistance of the resulting crosslinked polymer are improved by utilizing the carbon black. Note that HAF, ISAF, and SAF are particularly preferable from the viewpoint of improving the abrasion resistance of the crosslinked polymer. These carbon blacks may be used either alone or in combination.

The silica and the carbon black are preferably added to the polymer composition according to the first embodiment of the invention in a total amount of 20 to 130 parts by mass, and more preferably 25 to 110 parts by mass, based on 100 parts by mass of the polymer component in total. If the amount of the reinforcing agent is small, fracture resistance and the like may not be sufficiently improved. If the amount of the reinforcing agent is large, the processability of the polymer composition may deteriorate.

An advantage similar to that achieved when the silica and the carbon black are used in combination can be obtained by adding a carbon-silica dual-phase filler to the polymer composition according to the first embodiment of the invention. The carbon-silica dual-phase filler is silica-coated carbon black produced by chemically bonding silica to the surface of carbon black, and is commercially available from Cabot Corporation as CRX2000, CRX2002, and CRX2006. The carbon-silica dual-phase filler is preferably used in an amount of 1 to 100 parts by mass, and more preferably 5 to 95 parts by mass, based on 100 parts by mass of the polymer component in total.

Silane Coupling Agent

When the silica is added to the polymer composition according to the first embodiment of the invention as the reinforcing agent, it is preferable to add a silane coupling agent to the polymer composition in order to further improve the reinforcement effect. Examples of the silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, the mercaptosilane compound disclosed in Japanese Patent Application Publication (KOKAI) No. 2006-249069, and the like.

Examples of a commercially available product of the silane coupling agent include "NXT Silane", "NXT Z Silane", "NXT-Low-V Silane", and "NXT Ultra Low-V Silane" (manufactured by Momentive Performance Materials Inc.); "VP Si363" (manufactured by Degussa); "11-MERCAPTOUNDECYLTRIMETHOXYSILANE" (manufactured by Gelest); and the like.

Among these, bis(3-triethoxysilylpropyl) polysulfides, 3-trimethoxysilylpropylbenzothiazyl tetrasulfide, and the mercaptosilane compound disclosed in Japanese Patent Application Publication (KOKAI) No. 2006-249069 are preferable from the viewpoint of an improvement in reinforcement capability, and the like. These silane coupling agents may be used either alone or in combination.

The silane coupling agent is used in an appropriate amount taking account of the type of the silane coupling agent, and the like. The silane coupling agent is preferably used in an amount of 1 to 20 parts by mass, and more preferably 3 to 15 parts by mass, based on 100 parts by mass of the silica included in the polymer composition. If the silane coupling agent is used in an amount of less than 1 part by mass, the silane coupling agent may not achieve a sufficient effect. If the silane coupling agent is used in an amount of more than 20 parts by mass, the polymer component may easily gel.

Compatibilizer

When preparing the polymer composition according to the first embodiment of the invention, a compatibilizer may be added during kneading in order to improve processability during kneading, and further improve the balance among wet skid resistance, low hysteresis loss properties, and abrasion resistance. Example of a preferable compatibilizer include organic compounds selected from epoxy group-containing compounds, carboxylic acid compounds, carboxylic ester compounds, ketone compounds, ether compounds, aldehyde compounds, hydroxyl group-containing compounds, and amino group-containing compounds, silicon compounds selected from alkoxysilane compounds, siloxane compounds, and aminosilane compounds, and the like.

Specific examples of the organic compounds that may be used as the compatibilizer include epoxy group-containing compounds such as butyl glycidyl ether, diglycidyl ether, propylene oxide, neopentyl glycol diglycidyl ether, epoxy resins, epoxidized soybean oil, and epoxidized fatty acid esters; carboxylic acid compounds such as adipic acid, octylic acid, and methacrylic acid; carboxylic ester compounds such as acrylates, diethylene acrylate, ethyl methacrylate, orthoacetates, ethyl acetoacetate, butyl acetate, isopropyl acetate, dimethyl carbonate, p-hydroxyphenylacetic acid, a polyester-based plasticizer, and a stearic acid-based plasticizer; ketone compounds such as methylcyclohexanone and acetylacetone; ether compounds such as isopropyl ether and dibutyl ether; aldehyde compounds such as undecylene aldehyde, decyl aldehyde, vanillin, 3,4-dimethoxybenzaldehyde, and cuminaldehyde; amino group-containing compounds such as isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanoleamine, N-methylethanolamine, 3-amino-1-propanol, ethylamine hydrochloride, and hydrochloric n-butylamine hydrochloride; and hydroxyl group-containing compounds such as isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, and triethylene glycol.

Among these, epoxy group-containing compounds, amino group-containing compounds, and hydroxyl group-containing compounds are preferable.

Specific examples of the silicon compounds include alkoxysilane compounds such as trimethylmethoxysilane, trimethylethoxysilane, dimethyldimethoxysilane, methyltriethoxysilane, methyltriphenoxysilane, tetraethoxysilane, methyldiethoxysilane, and vinyltrimethoxysilane; siloxane compounds such as a dimethylsiloxane oligomer, silicone oil, an amino-modified silicone oil, an epoxy-modified silicone oil, a carboxyl-modified silicone oil, a polyether-modified silicone oil, an alkyl-modified silicone oil, a higher fatty acid ester-modified silicone oil, a higher alkoxy-modified silicone oil, and a higher fatty acid-containing silicone oil; and aminosilane compounds such as hexamethyldisilazane, nonamethyltrisilazane, anilinotrimethylsilane, bis(dimethylamino)dimethylsilane, bis(diethylamino)dimethylsilane, and triethylaminosilane.

Among these, silazane compound and bis(dimethylamino)dimethylsilane are preferable.

Vulcanizing Agent

The polymer composition according to the first embodiment of the invention includes a vulcanizing agent (crosslinking agent). Examples of the vulcanizing agent include sulfur, sulfur halides, organic peroxides, quinone dioximes, organic polyamine compounds, methylol group-containing alkylphenol resins, and the like. Sulfur is normally used as the vulcanizing agent. Sulfur is preferably used in an amount of 0.1 to 5 parts by mass, and more preferably 0.5 to 3 parts by mass, based on 100 parts by mass of the polymer component (in total) included in the polymer composition.

The polymer composition according to the first embodiment of the invention may optionally include a chemical, an additive, and the like that are normally used in the rubber industry. Examples of such a chemical or an additive include a vulcanization aid, a processing aid, a vulcanization accelerator, a process oil, an aging preventive, an anti-scorching agent, zinc oxide, stearic acid, and the like.

Stearic acid is normally used as the vulcanization aid and the processing aid. The vulcanization aid and the processing aid are normally used in an amount of 0.5 to 5 parts by mass based on 100 parts by mass of the polymer component (in total) included in the polymer composition.

Examples of the vulcanization accelerator include a sulfenamide-based compound, a guanidine-based compound, a thiuram-based compound, a thiourea-based compound, a thiazole-based compound, a dithiocarbamic acid-based compound, and a xanthic acid-based compound. Examples of a preferable vulcanization accelerator include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, di-o-tolylguanidine, o-tolylbisguanidine, and the like. The vulcanization accelerator is normally used in an amount of 0.1 to 5 parts by mass, and preferably 0.4 to 4 parts by mass, based on 100 parts by mass of the polymer component (in total) included in the polymer composition.

The polymer composition according to the first embodiment of the invention may be produced by kneading the polymer component, the silica, the crosslinking agent, and an optional component using a kneader such as an open-type kneader (e.g., roll) or an internal mixer (e.g., Banbury mixer). The polymer composition according to the first embodiment of the invention can be applied to various rubber products as a crosslinked polymer by crosslinking (vulcanizing) the polymer composition after molding. For example, the polymer composition may be applied to a tire (e.g., tire tread, undertread, carcass, sidewall, and bead), other industrial products such as a vibration-proof rubber, a fender, a belt, and a hose, and the like. In particular, the polymer composition may preferably be used as a tire tread rubber from the viewpoint of providing excellent low fuel consumption performance and wet skid resistance.

EXAMPLE 1

The first embodiment of the invention is further described below by way of examples. Note that the invention is not limited to the following examples. In the examples and comparative examples, the unit "parts" refers to "parts by mass", and the unit "%" refers to "mass %", unless otherwise specified. The property values of the modified conjugated diene-based polymer were measured using the following methods.

The bound styrene content (%) was determined by $^1$H-NMR (500 MHz).

The vinyl content (%) after modification was determined by $^1$H-NMR (500 MHz).

The polystyrene-reduced weight average molecular weight before modification was determined from the retention time that corresponds to the vertex of the maximum peak of the GPC curve obtained using a gel permeation chromatograph ("HLC-8120GPC" manufactured by Tosoh Corporation) under the following conditions.

Column: "GMHHXL" (manufactured by Tosoh Corporation) (×2)
Column temperature: 40° C.
Mobile phase: tetrahydrofuran
Flow rate: 1.0 ml/min
Sample concentration: 10 mg/20 ml The Mooney viscosity (ML1+4, 100° C.) was measured in accordance with JIS K 6300-1 using an L rotor (preheating time: 1 minute, rotor operation time: 4 minutes, temperature: 100° C.).

Synthesis (1) of Modified Conjugated Diene-Based Polymer

EXAMPLE 1A

An autoclave reactor (internal volume: 5l) in which the internal atmosphere had been replaced with nitrogen, was charged with 2500 g of cyclohexane, 2.45 mmol of 2,2-di (2-tetrahydrofuryl)propane (compound V1), 125 g of styrene, and 365 g of 1,3-butadiene. After adjusting the temperature of the mixture contained in the reactor to 10° C., 5.20 mmol of n-butyllithium was added to the mixture to initiate polymerization. The polymerization was effected under adiabatic conditions, and the maximum temperature reached 85° C. When the polymerization conversion rate reached 99%, 4.46 mmol of N,N-bis(trimethylsilyl)aminopropylmethyldiethoxysilane (aminosilane A) was added to the mixture as a terminal-modifying agent, and the mixture was reacted for 15 minutes.

After the addition of 4.46 mmol of n-butyllithium and 4.46 mmol of tetramethylethylenediamine to the polymer solution, the mixture was reacted at 80° C. for 10 minutes. After completion of the reaction, 4.46 mmol of N,N-bis (trimethylsilyl)aminopropylmethyldiethoxysilane was added to the polymer solution as a main chain-modifying agent, and the mixture was reacted for 15 minutes, followed by addition of 2.0 g of 2,6-di-tert-butyl-p-cresol. The solvent was removed by performing steam stripping using hot water of which the pH was adjusted to 9 using sodium hydroxide to obtain a polymer. The polymer was dried using a heated roll of which the temperature was controlled at 110° C. The polymer obtained by this series of operations is referred to as "modified conjugated diene-based polymer A-1". The modified conjugated diene-based polymer A-1 had a Mooney viscosity (ML1+4, 100° C.) of 10. Table 1 shows the property value measurement results.

EXAMPLES 2A and 4A to 6A

Modified conjugated diene-based polymers B-1 and D-1 to F-1 were synthesized, and the property values of the modified conjugated diene-based polymers were measured in the same manner as in Example 1A, except that the type and the amount of the modifying agent (terminal-modifying agent and main chain-modifying agent) were changed as shown in Table 1. The modified conjugated diene-based polymers B-1 and D-1 to F-1 had a Mooney viscosity (ML1+4, 100° C.) of 12, 9, 9, and 12, respectively.

EXAMPLE 3A

The polymerization reaction and the terminal modification reaction were effected in the same manner as in Example 1A. After the addition of 2.20 mmol of titanocene chloride and 4.46 mmol of diisobutylaluminum hydride to the polymer solution, the mixture was reacted at 80° C. for 10 minutes. After the addition of 4.46 mmol of tetraglycidyl-1,3-bisaminomethylcyclohexane (epoxyamine B) to the polymer solution as a main chain-modifying agent, the mixture was reacted for 30 minutes, followed by addition of 2.0 g of 2,6-di-tert-butyl-p-cresol. The solvent was removed by performing steam stripping using hot water of which the pH was adjusted to 9 using sodium hydroxide to obtain a polymer. The polymer was dried using a heated roll of which the temperature was controlled at 110° C. The polymer obtained by this series of operations is referred to as "modified conjugated diene-based polymer C-1". The modified conjugated diene-based polymer C-1 had a Mooney viscosity (ML1+4, 100° C.) of 12. Table 1 shows the property value measurement results.

EXAMPLE 7A

The polymerization reaction, the terminal modification reaction, and the main chain modification reaction were effected, and the solvent removal operation and the drying operation were performed in the same manner as in Example 1A, except that 110 g of styrene and 15 g of p-methylstyrene were used as the monomers. The polymer thus obtained is referred to as "modified conjugated diene-based polymer G-1". The modified conjugated diene-based polymer G-1 had a Mooney viscosity (ML1+4, 100° C.) of 10. Table 1 shows the property value measurement results.

EXAMPLE 8A

A modified conjugated diene-based polymer H-1 was synthesized in the same manner as in Example 1A, except that 4.52 mmol of silicon tetrachloride was added as an onium salt generator after adding the main chain-modifying agent, and reacting the mixture for 15 minutes. The property values of the modified conjugated diene-based polymer H-1 were measured. Note that the modified conjugated diene-based polymer H-1 had a Mooney viscosity (ML1+4, 100° C.) of 60.

EXAMPLE 9A

A modified conjugated diene-based polymer I-1 was synthesized in the same manner as in Example 1A, except that the autoclave reactor was charged with 4.20 mmol of N-(tert-butyldimethylsilyl)piperazine (N-substituted piperazine) together with the monomers, the vinyl content modifier, and the solvent. The property values of the modified conjugated diene-based polymer I-1 were measured. Note that the modified conjugated diene-based polymer I-1 had a Mooney viscosity (ML1+4, 100° C.) of 11.

EXAMPLES 10A to 12A

Modified conjugated diene-based polymers J-1, K-1, and L-1 were synthesized in the same manner as in Example 9A, except that tetraglycidyl-1,3-bisaminomethylcyclohexane was used as the main chain-modifying agent (Example 10A), or piperidine was used instead of N-(tert-butyldimethylsilyl)piperazine (Example 11A), or the type and the amount of the terminal-modifying agent were changed as shown in Table 2 (Example 12A). The property values of the modified conjugated diene-based polymers J-1, K-1, and L-1 were measured. Note that the modified conjugated diene-based polymers J-1, K-1, and L-1 had a Mooney viscosity (ML1+4, 100° C.) of 12, 10, and 52, respectively.

EXAMPLES 13A and 14A

Modified conjugated diene-based polymers M-1 and N-1 were synthesized in the same manner as in Example 9A, except that the compound shown in Table 2 was added as an onium salt generator after adding the main chain-modifying agent, and reacting the mixture for 15 minutes. The property values of the modified conjugated diene-based polymers M-1 and N-1 were measured. Note that the modified conjugated diene-based polymers M-1 and N-1 had a Mooney viscosity (ML1+4, 100° C.) of 47 and 70, respectively.

COMPARATIVE EXAMPLES 1A to 3A

Modified conjugated diene-based polymers P-1, Q-1, and U-1 were synthesized in the same manner as in Example 1A, except that the types and the amounts of the compounds used to synthesize the polymer were changed as shown in Table 2. In Comparative Examples 1A and 2A, steam stripping was performed without adding n-butyllithium, tetramethylethylenediamine, and the main chain-modifying agent after the addition of the terminal-modifying agent.

COMPARATIVE EXAMPLE 4A

An autoclave reactor (internal volume: 5l) in which the internal atmosphere had been replaced with nitrogen, was charged with 2500 g of cyclohexane, 2.45 mmol of 2,2-di(2-tetrahydrofuryl)propane, 50 g of styrene, and 145 g of 1,3-butadiene. 5.20 mmol of n-butyllithium was added to the mixture to initiate polymerization. After adjusting the temperature inside the polymerization reactor to 65° C., the mixture was reacted while adding 25 g of styrene and 75 g of 1,3-butadiene over 45 minutes. 1.5 g of 1-(4-N,N-dimethylaminophenyl)-1-phenylethylene was added to the mixture when 45 minutes had elapsed from the addition of n-butyllithium, and the mixture was reacted. When 65 minutes had elapsed from the addition of 1-(4-N,N-dimethylaminophenyl)-1-phenylethylene, a copolymerization reaction was effected for 130 minutes while continuously adding 50 g of styrene and 145 g of 1,3-butadiene to the reactor. After the addition of 4.46 mmol of N,N-bis(trimethylsilyl)aminopropylmethyldiethoxysilane, the mixture was reacted for 15 minutes. After the addition of 2.0 g of 2,6-di-tert-butyl-p-cresol to the polymer solution, the solvent was removed by performing steam stripping using hot water of which the pH was adjusted to 9 using sodium hydroxide to obtain a modified conjugated diene-based polymer. The polymer was dried using a heated roll of which the temperature was controlled at 110° C. to obtain a modified conjugated diene-based polymer V-1.

TABLE 1

| | | | Example 1A | Example 2A | Example 3A | Example 4A | Example 5A | Example 6A | Example 7A | Example 8A | Example 9A |
|---|---|---|---|---|---|---|---|---|---|---|---|
| Type of modified conjugated diene-based polymer | | | A-1 | B-1 | C-1 | D-1 | E-1 | F-1 | G-1 | H-1 | I-1 |
| Component | Solvent | | | | | | | | | | |
| | Cyclohexane | (g) | 2500 | 2500 | 2500 | 2500 | 2500 | 2500 | 2500 | 2500 | 2500 |
| | Vinyl content modifier | | | | | | | | | | | |
| | Compound V1 | (mmol) | 2.45 | 2.45 | 2.45 | 2.45 | 2.45 | 2.45 | 2.45 | 2.45 | 2.45 |
| | Monomer | | | | | | | | | | | |
| | Styrene | (g) | 125 | 125 | 125 | 125 | 125 | 125 | 110 | 125 | 125 |
| | p-Methylstyrene | (g) | — | — | — | — | — | — | 15 | — | — |
| | Compound M1 | (g) | — | — | — | — | — | — | — | — | — |
| | 1,3-Butadiene | (g) | 365 | 365 | 365 | 365 | 365 | 365 | 365 | 365 | 365 |
| | Initiator | | | | | | | | | | | |
| | n-Butyllithium | (mmol) | 5.20 | 5.20 | 5.20 | 5.20 | 5.20 | 5.20 | 5.20 | 5.20 | 5.20 |
| | N-substituted piperazine | (mmol) | — | — | — | — | — | — | — | — | 4.20 |
| | Piperidine | (mmol) | — | — | — | — | — | — | — | — | — |
| | Terminal-modifying agent | | | | | | | | | | | |
| | Aminosilane A | (mmol) | 4.46 | 4.46 | 4.46 | 4.46 | 4.46 | — | 4.46 | 4.46 | 4.46 |
| | Epoxyamine B | (mmol) | — | — | — | — | — | 4.46 | — | — | — |
| | Silicon tetrachloride | (mmol) | — | — | — | — | — | — | — | — | — |
| | Main chain-modifying agent | | | | | | | | | | | |
| | Aminosilane A | (mmol) | 4.46 | 8.92 | — | — | — | 4.46 | 4.46 | 4.46 | 4.46 |
| | Epoxyamine B | (mmol) | — | — | 4.46 | — | — | — | — | — | — |
| | N-Methylpyrrolidone | (mmol) | — | — | — | 4.46 | — | — | — | — | — |
| | Isocyanate E1 | (mmol) | — | — | — | — | 4.46 | — | — | — | — |
| | Onium salt generator | | | | | | | | | | | |
| | Maleic acid | (mmol) | — | — | — | — | — | — | — | — | — |
| | Silicon tetrachloride | (mmol) | — | — | — | — | — | — | — | 4.52 | — |
| Crude rubber properties | Bound styrene content | [%] | 25 | 25 | 25 | 25 | 25 | 25 | 25 | 25 | 25 |
| | Vinyl content | [%] | 55 | 55 | 55 | 55 | 55 | 55 | 55 | 55 | 55 |
| | Weight average molecular weight | [×10$^4$] | 20 | 20 | 20 | 20 | 20 | 20 | 20 | 20 | 20 |
| Evaluation | 0° C. tanδ (INDEX) | | 123 | 124 | 110 | 112 | 110 | 108 | 120 | 121 | 130 |
| | 70° C. tanδ (INDEX) | | 124 | 129 | 115 | 113 | 112 | 112 | 122 | 121 | 134 |

TABLE 2

| | | | Example 10A | Example 11A | Example 12A | Example 13A | Example 14A | Comparative Example 1A | Comparative Example 2A | Comparative Example 3A | Comparative Example 4A |
|---|---|---|---|---|---|---|---|---|---|---|---|
| Type of modified conjugated diene-based polymer | | | J-1 | K-1 | L-1 | M-1 | N-1 | P-1 | Q-1 | U-1 | V-1 |
| Component | Solvent | | | | | | | | | | |
| | Cyclohexane | (g) | 2500 | 2500 | 2500 | 2500 | 2500 | 2500 | 2500 | 2500 | 2500 |
| | Vinyl content modifier | | | | | | | | | | | |
| | Compound V1 | (mmol) | 2.45 | 2.45 | 2.45 | 2.45 | 2.45 | 2.45 | 2.45 | 2.45 | 2.45 |
| | Monomer | | | | | | | | | | | |
| | Styrene | (g) | 125 | 125 | 125 | 125 | 125 | 125 | 125 | 125 | 125 |
| | p-Methylstyrene | (g) | — | — | — | — | — | — | — | — | — |
| | Compound M1 | (g) | — | — | — | — | — | — | — | — | 1.5 |
| | 1,3-Butadiene | (g) | 365 | 365 | 365 | 365 | 365 | 365 | 365 | 365 | 365 |
| | Initiator | | | | | | | | | | | |
| | n-Butyllithium | (mmol) | 5.20 | 5.20 | 5.20 | 5.20 | 5.20 | 5.20 | 5.20 | 5.20 | 5.20 |
| | N-substituted piperazine | (mmol) | 4.20 | — | 4.20 | 4.20 | 4.20 | — | — | 4.20 | — |
| | Piperidine | (mmol) | — | 4.20 | — | — | — | — | — | — | — |
| | Terminal-modifying agent | | | | | | | | | | | |
| | Aminosilane A | (mmol) | 4.46 | 4.46 | 2.66 | 4.46 | 4.46 | 4.46 | — | — | 4.46 |
| | Epoxyamine B | (mmol) | — | — | — | — | — | — | 4.46 | — | — |
| | Silicon tetrachloride | (mmol) | — | — | 0.45 | — | — | — | — | 0.45 | — |
| | Main chain-modifying agent | | | | | | | | | | | |
| | Aminosilane A | (mmol) | — | 4.46 | 4.46 | 4.46 | 4.46 | — | — | 4.46 | — |
| | Epoxyamine B | (mmol) | 4.46 | — | — | — | — | — | — | — | — |
| | N-Methylpyrrolidone | (mmol) | — | — | — | — | — | — | — | — | — |
| | Isocyanate E1 | (mmol) | — | — | — | — | — | — | — | — | — |
| | Onium salt generator | | | | | | | | | | | |
| | Maleic acid | (mmol) | — | — | — | 9.03 | — | — | — | — | — |
| | Silicon tetrachloride | (mmol) | — | — | — | — | 4.52 | — | — | — | — |

TABLE 2-continued

|  |  |  | Example 10A | Example 11A | Example 12A | Example 13A | Example 14A | Comparative Example 1A | Comparative Example 2A | Comparative Example 3A | Comparative Example 4A |
|---|---|---|---|---|---|---|---|---|---|---|---|
| Crude rubber properties | Bound styrene content | [%] | 25 | 25 | 25 | 25 | 25 | 25 | 25 | 25 | 25 |
|  | Vinyl content | [%] | 55 | 55 | 55 | 55 | 55 | 55 | 55 | 55 | 55 |
|  | Weight average molecular weight | [×10⁴] | 20 | 20 | 20 | 20 | 20 | 20 | 20 | 20 | 20 |
| Evaluation | 0° C. tanδ (INDEX) |  | 128 | 120 | 115 | 132 | 131 | 100 | 105 | 102 | 105 |
|  | 70° C. tanδ (INDEX) |  | 130 | 126 | 122 | 133 | 132 | 100 | 94 | 95 | 107 |

The details of the compound M1 and the isocyanate E1 in Tables 1 and 2 are shown below.
Compound M1: 1-(4-N,N-dimethylaminophenyl)-1-phenylethylene
Isocyanate E1: toluene diisocyanate
Production and Evaluation (1) of Polymer Composition and Crosslinked Polymer

EXAMPLE 1A-1

The modified conjugated diene-based polymer A-1 and the components shown in Table 3 were mixed, and kneaded to produce a polymer composition. The components were kneaded as described below. Specifically, the modified conjugated diene-based polymer A-1, the polybutadiene rubber, the extender oil, silica, carbon black, the silane coupling agent, stearic acid, the aging preventive, and zinc oxide were mixed, and kneaded using a plastomill (internal volume: 250 ml) equipped with a temperature controller at a filling rate of 72% and a rotational speed of 60 rpm (first-step kneading). After cooling the mixture to room temperature, sulfur and the vulcanization accelerator were added to the mixture, and the mixture was kneaded (second-step kneading). The mixture was then molded, and vulcanized at 160° C. for a given time using a vulcanizing press to obtain a crosslinked polymer (vulcanized polymer).

TABLE 3

| Component |  | Parts by mass |
|---|---|---|
| Modified conjugated diene-based polymer |  | 70 |
| Polybutadiene rubber | *1 | 30 |
| Extender oil | *2 | 37.5 |
| Silica | *3 | 70 |
| Carbon black | *4 | 5.6 |
| Silane coupling agent | *5 | 5.6 |
| Stearic acid |  | 2 |
| Aging preventive | *6 | 1 |
| Zinc oxide |  | 3 |
| Vulcanization accelerator D | *7 | 1.5 |
| Vulcanization accelerator CZ | *8 | 1.8 |
| Sulfur |  | 1.5 |

*1: BR01 manufactured by JSR Corporation,
*2: JOMO Process NC-140 manufactured by Japan Energy Corporation,
*3: ZEOSIL 1165MP manufactured by Rhodia,
*4: DIABLACK N339 manufactured by Mitsubishi Chemical Corporation,
*5: Si75 manufactured by Evonik,
*6: OZONONE 6C manufactured by Seiko Chemical Co., Ltd.,
*7: NOCCELER D manufactured by Ouchi Shinko Chemical Industrial Co., Ltd.,
*8: NOCCELER CZ manufactured by Ouchi Shinko Chemical Industrial Co., Ltd.

The details of each component in Table 3 are shown below.
Evaluation of Tire Performance
The properties (tire performance) of the polymer composition and the crosslinked polymer were evaluated as described below. The evaluation results are shown in Tables 1 and 2. Note that the evaluation results are shown in Tables 1 and 2 corresponding to the polymer used.
(1) 0° C. tan δ
The crosslinked polymer was used as a measurement specimen, and the loss tangent 0° C. tan δ of the measurement specimen was measured using a rheometer "ARES-RDA" (manufactured by TA Instruments) at a shear strain of 0.1%, an angular velocity of 100 rad/s, and a temperature of 0° C. The loss tangent 0° C. tan δ is indicated as an index relative to the value (=100) of Comparative Example 1A-1. A larger index value indicates better wet skid resistance.
(2) 70° C. tan δ
The crosslinked polymer was used as a measurement specimen, and the loss tangent 70° C. tan δ of the measurement specimen was measured using a rheometer "ARES-RDA" (manufactured by TA Instruments) at a shear strain of 1.0%, an angular velocity of 100 rad/s, and a temperature of 70° C. The loss tangent 70° C. tan δ is indicated as an index relative to the value (=100) of Comparative Example 1A-1. A larger index value indicates a smaller energy loss and better low hysteresis loss properties.

EXAMPLES 2A-1 to 14A-1 and COMPARATIVE EXAMPLES 1A-1 to 4A-1

A polymer composition and a crosslinked polymer were produced, and the tire performance was evaluated in the same manner as in Example 1A-1, except that the polymers B-1 to N-1, P-1, Q-1, U-1, and V-1 were respectively used as the modified conjugated diene-based polymer. The results are shown in Tables 1 and 2.
As shown in Tables 1 and 2, good low hysteresis loss properties were achieved when using the modified conjugated diene-based polymers of Examples 1A to 14A as compared with the case of using the polymers of the comparative examples. In particular, excellent low hysteresis loss properties were achieved when using the modified conjugated diene-based polymers of Examples 9A, 10A, 13A, and 14A. Excellent wet skid resistance was achieved when using the modified conjugated diene-based polymers of Examples 1A to 14A as compared with the case of using the polymers of the comparative examples.
Synthesis (2) of Modified Conjugated Diene-Based Polymer

EXAMPLE 15A

An autoclave reactor (internal volume: 5l) in which the internal atmosphere had been replaced with nitrogen, was charged with 3500 g of cyclohexane, 0.47 mmol of 2,2-di(2-tetrahydrofuryl)propane (compound V1), and 500 g of 1,3-butadiene. After adjusting the temperature of the mixture contained in the reactor to 40° C., 5.46 mmol of n-butyllithium was added to the mixture to initiate polymerization. The polymerization was effected under adiabatic conditions, and the maximum temperature reached 90° C. When the polymerization conversion rate reached 99%, 5.13 mmol of N,N-bis(trimethylsilyl)aminopropylmethyldiethoxysilane (aminosilane A) was added to the mixture as a terminal-modifying agent, and the mixture was reacted for 15 minutes.

After the addition of 5.13 mmol of n-butyllithium and 5.13 mmol of tetramethylethylenediamine to the polymer solution, the mixture was reacted at 80° C. for 10 minutes. After the addition of 5.13 mmol of N,N-bis(trimethylsilyl) aminopropylmethyldiethoxysilane to the polymer solution as a main chain-modifying agent, the mixture was reacted for 15 minutes, followed by addition of 2.0 g of 2,6-di-tert-butyl-p-cresol. The solvent was removed by performing steam stripping using hot water of which the pH was adjusted to 9 using sodium hydroxide to obtain a polymer. The polymer was dried using a heated roll of which the temperature was controlled at 110° C. The polymer obtained by this series of operations is referred to as "modified conjugated diene-based polymer W-1". The modified conjugated diene-based polymer W-1 had a Mooney viscosity (ML1+4, 100° C.) of 10.

COMPARATIVE EXAMPLE 5A

A modified conjugated diene-based polymer X-1 was synthesized in the same manner as in Example 15A, except that steam stripping was performed without adding n-butyllithium, tetramethylethylenediamine, and the main chain-modifying agent after the addition of the terminal-modifying agent. The modified conjugated diene-based polymer X-1 had a Mooney viscosity (ML1+4, 100° C.) of 10.

Production and Evaluation (2) of Polymer Composition and Crosslinked Polymer

EXAMPLE 15A-1 and COMPARATIVE EXAMPLE 5A-1

A polymer composition and a crosslinked polymer were produced, and the tire performance was evaluated in the same manner as in Example 1A-1, except that the polymers W-1 and X-1 were respectively used as the modified conjugated diene-based polymer. The results are shown in Table 4. The measurement results for the loss tangent 70° C. tan δ and the loss tangent 10° C. tan δ are indicated as an index relative to the value (=100) of Comparative Example 5A-1.

TABLE 4

| | | | Example 15A | Comparative Example 5A |
|---|---|---|---|---|
| Type of modified conjugated diene-based polymer | | | W-1 | X-1 |
| Component | Solvent | | | |
| | Cyclohexane | (g) | 3500 | 3500 |
| | Vinyl content modifier | | | |
| | Compound VI | (mmol) | 0.47 | 0.47 |
| | Monomer | | | |
| | Styrene | (g) | — | — |
| | 1,3-Butadiene | (g) | 500 | 500 |
| | Initiator | | | |
| | n-Butyllithium | (mmol) | 5.46 | 5.46 |
| | Terminal-modifying agent | | | |
| | Aminosilane A | (mmol) | 5.13 | 5.13 |
| | Main chain-modifying agent | | | |
| | Aminosilane A | (mmol) | 5.13 | — |

TABLE 4-continued

| | | | Example 15A | Comparative Example 5A |
|---|---|---|---|---|
| Crude rubber properties | Bound styrene content | [%] | 0 | 0 |
| | Vinyl content | [%] | 30 | 30 |
| | Weight average molecular weight | [×10$^4$] | 20 | 20 |
| Evaluation | 0° C. tan δ (INDEX) | | 105 | 100 |
| | 70° C. tan δ (INDEX) | | 115 | 100 |

As shown in Table 4, good low hysteresis loss properties and good wet skid resistance were achieved when using the modified conjugated diene-based polymer of Example 15A as compared with the case of using the modified conjugated diene-based polymer of Comparative Example 5A.

Second Embodiment

[1] Modified conjugated diene-based polymer and method for producing the same

A modified conjugated diene-based polymer according to a second embodiment of the invention includes a polymer that includes a structural unit derived from a conjugated diene compound, a functional group that interacts with silica, the functional group being situated at one terminal or each terminal of the polymer, and a polymer structure that includes a repeating unit (p), the repeating unit (p) including at least one atom selected from the group consisting of a nitrogen atom, an oxygen atom, a phosphorus atom, and a sulfur atom, the polymer structure being situated in a side chain of the polymer. The modified conjugated diene-based polymer according to the second embodiment of the invention may be obtained by utilizing a polymer (P) as the specific compound in the main chain modification step described above in connection with the first embodiment of the invention, the polymer (P) including the repeating unit (p) that includes at least one atom selected from the group consisting of a nitrogen atom, an oxygen atom, a phosphorus atom, and a sulfur atom. The modified conjugated diene-based polymer according to the second embodiment of the invention may be produced using the following method (1) or (2), for example.

(1) A method that includes a polymerization step that polymerizes a conjugated diene compound, or polymerizes a conjugated diene compound and an aromatic vinyl compound, in the presence of an alkali metal compound or an alkaline-earth metal compound to obtain a conjugated diene-based polymer having an active terminal, a terminal modification step that reacts the active terminal of the conjugated diene-based polymer with a compound (A1) that includes a functional group that interacts with silica, and a main chain modification step that reacts at least either an unsaturated bond or a functional group that is included in the conjugated diene-based polymer and is not situated at a terminal of the conjugated diene-based polymer, with the polymer (P) that includes the repeating unit (p) that includes at least one atom selected from the group consisting of a nitrogen atom, an oxygen atom, a phosphorus atom, and a sulfur atom.

(2) A method that includes a polymerization step that polymerizes a conjugated diene compound, or polymerizes a conjugated diene compound and an aromatic vinyl compound, in the presence of an alkali metal compound or an alkaline-earth metal compound (provided that the alkali metal compound or the alkaline-earth metal compound may be a metal amide compound) to obtain a conjugated diene-based polymer having an active terminal, and a main chain modification step that reacts at least either an unsaturated bond or a functional group that is included in the conjugated diene-based polymer and is not situated at a terminal of the conjugated diene-based polymer, with the polymer (P) that includes the repeating unit (p) that includes at least one atom selected from the group consisting of a nitrogen atom, an oxygen atom, a phosphorus atom, and a sulfur atom.

Note that the method (1) can produce a modified conjugated diene-based polymer in which at least the polymerization-end terminal and the side chain of the conjugated diene-based polymer include a functional group that interacts with silica. The method (2) can produce a modified conjugated diene-based polymer in which the polymerization-initiation terminal and the side chain of the conjugated diene-based polymer include a functional group that interacts with silica. Each step is described in detail below. Note that the description given above in connection with the first embodiment of the invention may be applied to the same parts as those described above in connection with the first embodiment of the invention.

Polymerization Step

In the polymerization step, the conjugated diene compound is polymerized, or the conjugated diene compound and the aromatic vinyl compound are polymerized, in the presence of the alkali metal compound or the alkaline-earth metal compound to obtain the conjugated diene-based polymer having an active terminal. Note that the description given above in connection with the first embodiment of the invention may be applied to the monomer, the initiator, the organic solvent, and the reaction conditions used for the polymerization.

Terminal Modification Step

In the terminal modification step, the active terminal of the conjugated diene-based polymer is reacted with the compound (A1) that includes a functional group that interacts with silica. Note that the description given above in connection with the first embodiment of the invention may be applied to the compound (A1) and the reaction conditions used for the terminal modification step.

Main Chain Modification Step

In the main chain modification step, at least either an unsaturated bond or a functional group that is included in the conjugated diene-based polymer obtained by the polymerization step and is not situated at the terminal of the conjugated diene-based polymer, is reacted with the specific polymer (P) that has high affinity to silica. A modified conjugated diene-based polymer that includes a graft chain having high affinity to silica can thus be obtained.

Polymer (P)

The polymer (P) used for the modification reaction (hereinafter may be referred to as "main chain modification reaction") in the main chain modification step includes the repeating unit (p) that includes at least one atom selected from the group consisting of a nitrogen atom, an oxygen atom, a phosphorus atom, and a sulfur atom. It is preferable that the polymer (P) that includes the repeating unit (p) include at least one structure selected from the group consisting of a polysiloxane structure, a polyether structure, and a polyimine structure, due to excellent affinity to silica. When the polymer (P) includes a polysiloxane structure, it is preferable that the repeating unit (p) have a structure represented by the following formula (p-1), for example.

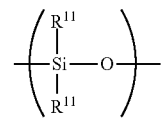

(p-1)

wherein $R^{11}$ is a hydrogen atom, a hydrocarbyl group having 1 to 10 carbon atoms, an alkoxy group having 1 to 10 carbon atoms, an amino group, a hydroxyl group, or an ester group, provided that the hydrocarbyl group having 1 to 10 carbon atoms optionally includes at least one substituent selected from the group consisting of an epoxy group, an amino group, a carboxyl group, a hydroxyl group, and a mercapto group, and optionally includes "—O—" or "—COO—" between carbon atoms, $R^{11}$ included in an identical repeating unit are either identical or different, and $R^{11}$ included in different repeating units are either identical or different.

Examples of the hydrocarbyl group having 1 to 10 carbon atoms that may be represented by $R^{11}$ in the general formula (p-1) include alkyl groups such as a methyl group, an ethyl group, an n-propyl group, an isopropyl group, an n-butyl group, an n-pentyl group, an n-hexyl group, an n-octyl group, and an n-decyl group; cycloalkyl groups such as a cyclopentyl group and a cyclohexyl group; aryl groups such as a phenyl group and a tolyl group; aralkyl groups such as a benzyl group and a β-methylphenethyl group; and the like. The hydrocarbyl group represented by $R^{11}$ may be substituted with a substituent such as an epoxy group, an amino group, a carboxyl group, a hydroxyl group, or a mercapto group.

Examples of the alkoxy group having 1 to 10 carbon atoms that may be represented by $R^{11}$ include a methoxy group, an ethoxy group, a propoxy group, and the like. Examples of the ester group include a group represented by *—OCOR$^a$ (wherein R$^a$ is a hydrocarbyl group having 1 to 10 carbon atoms, and "*" is a bonding site bonded to the silicon atom), and the like.

When the polymer (P) includes a polyether structure, it is preferable that the repeating unit (p) have a structure represented by the following formula (p-2), for example.

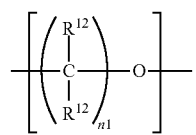

(p-2)

wherein $R^{12}$ is a hydrogen atom, a hydrocarbyl group having 1 to 10 carbon atoms, an alkoxy group having 1 to 10 carbon atoms, an amino group, a hydroxyl group, or an ester group, provided that the hydrocarbyl group having 1 to 10 carbon atoms optionally includes at least one substituent selected from the group consisting of an epoxy group, an amino group, a carboxyl group, a hydroxyl group, and a mercapto group, and optionally includes "—O—" or "—COO—" between carbon atoms, and n1 is an integer from 1 to 10, provided that $R^{12}$ included in an identical repeating unit are either identical or different, $R^{12}$ included in different repeating units are either identical or different, and n1 are either identical or different between different repeating units.

The description given above in connection with $R^{11}$ may be applied to the hydrocarbyl group having 1 to 10 carbon atoms and the alkoxy group having 1 to 10 carbon atoms that may be represented by $R^{12}$. Examples of the ester group that may be represented by $R^{12}$ include a group represented by *—$OCOR^b$ (wherein $R^b$ is a hydrocarbyl group having 1 to 10 carbon atoms, and "*" is a bonding site bonded to the carbon atom), and the like.

Examples of the repeating unit (p) when the polymer (P) includes a polyimine structure, include —[(CH$_2$)$_m$—NH]— (wherein m is an integer from 2 to 4), and the like. In this case, the repeating unit (p) is preferably —[(CH$_2$)$_2$—NH]—.

It is preferable that the polymer (P) include the repeating unit represented by the formula (p-1) since the processability of the polymer composition as well as the low hysteresis loss properties and the abrasion resistance when the polymer composition is applied to an automotive tire can be improved in a well-balanced manner.

It is preferable that the degree of polymerization of the repeating unit (p) included in the polymer (P) be 5 to 200. When the degree of polymerization is 5 or more, the dispersibility of silica in the polymer composition tends to be further improved. When the degree of polymerization is 200 or less, the mutual solubility with the main chain of the conjugated diene-based polymer is moderately maintained. The degree of polymerization is more preferably 5 to 100, and still more preferably 5 to 50.

The polymer (P) that is reacted with the conjugated diene-based polymer may include a functional group that can react with an active site formed by utilizing at least either an unsaturated bond or a functional group that is included in the conjugated diene-based polymer and is not situated at the terminal of the conjugated diene-based polymer. Examples of such a functional group include an epoxy group, an alkoxysilyl group, a (meth)acryloyl group, an amino group, a hydroxyl group, an acid anhydride group, a thiol group, and the like.

The polymer (P) may be synthesized by appropriately combining normal methods used in organic chemistry, or a commercially available product may be used as the polymer (P). Specific examples of a commercially available product that may be used as the polymer (P) include compounds having a polysiloxane structure, such as KF-8010, X-22-161A, X-22-161B, KF-8012, KF-105, X-22-163A, X-22-163B, X-22-163C, X-22-169AS, X-22-169B, X-22-160AS, KF-6001, KF-6002, KF-6003, X-22-1821, X-22-164A, X-22-164B, X-22-164C, X-22-162C, X-22-2290AS, X-22-167B, X-22-167C, X-22-4272, X-22-4952, X-22-6266, X-22-3939A, X-22-1660B-3, X-22-9412, KF-1002, X-22-4741, X-22-2000, X-22-3000T, X-22-1602, X-22-173BX, X-22-173DX, X-22-170BX, X-22-170DX, X-22-176DX, X-22-176GX-A, X-22-174DX, X-22-2426, X-22-2475, X-21-5841, X-22-3710, KF-857, X-22-9002, KF-865, KF-393, X-22-3939A, X-22-4741, X-22-4015, KF-2001, and X-22-3701E (manufactured by Shin-Etsu Chemical Co., Ltd.); compounds having a polyether structure, such as EPIOL E-400 and EPIOL E-1000 (manufactured by NOF Corporation), and SR-8EG, SR-TPG, and SR-4PG (manufactured by Sakamoto Yakuhin Kogyo Co., Ltd.); compounds having a polyimine structure, such as EPOMIN SP-003, EPOMIN SP-006, EPOMIN SP-012, and EPOMIN SP-018 (manufactured by Nippon Shokubai Co., Ltd.), and the Lupasol series of products (manufactured by BASF). Note that these polymers (P) may be used either alone or in combination. The compound (A1) and the polymer (P) may be used in combination as the specific compound.

The polymer (P) may be bonded to the side chain of the conjugated diene-based polymer using an arbitrary method. The polymer (P) may be bonded to the side chain of the conjugated diene-based polymer by appropriately combining normal methods used in organic chemistry. For example, the polymer (P) may be bonded to the side chain of the conjugated diene-based polymer using the method (hydrometalation or lithiation) described above in connection with the first embodiment of the invention. The description given above in connection with the first embodiment of the invention may be applied to the details of hydrometalation and lithiation (e.g., the type and the amount of hydrometalation agent, the type and the amount of lithiation agent, and the reaction conditions), and the reaction conditions for the conjugated diene-based polymer and the polymer (P) (specific compound) after hydrometalation or lithiation.

When using the hydrometalation reaction, the polymer (P) is preferably used in an amount of 0.1 to 10 molar equivalents, and more preferably 0.1 to 5 molar equivalents, based on 1 molar equivalent of the hydrometalation agent.

When using the lithiation reaction, the polymer (P) is preferably used in an amount of 0.1 to 10 molar equivalents, and more preferably 0.1 to 5 molar equivalents, based on 1 molar equivalent of the lithiation agent.

Note that the structure derived from the polymer (P) may be introduced into the main chain or the side chain of the conjugated diene-based polymer through the reaction between a site of the conjugated diene-based polymer other than the terminal, and the polymer (P) using a method other than the above method. For example, the unsaturated double bond included in the structural unit that is included in the conjugated diene-based polymer and derived from the conjugated diene compound may be reacted with the polymer (P) using a radical generator such as azobisisobutyronitrile. Alternatively, an active site may be formed in at least either an unsaturated bond or a functional group that is included in the main chain or the side chain of the conjugated diene-based polymer, and reacted with a polyfunctional compound that includes a first functional group that can react with the active site, and a second functional group that can react with the polymer (P), and the second functional group of the polyfunctional compound may be reacted with the functional group of the polymer (P), for example.

Additional Step

The method for producing a modified conjugated diene-based polymer according to the second embodiment of the invention may include a step (mixing step) that mixes the terminal-modified conjugated diene-based polymer with an onium salt generator in the same manner as the method for producing a modified conjugated diene-based polymer according to the first embodiment of the invention. The description given above in connection with the first embodiment of the invention may be applied to the details of the mixing step.

[2] Polymer Composition

A polymer composition according to the second embodiment of the invention includes a modified conjugated diene-based polymer obtained using the method for producing a modified conjugated diene-based polymer according to the second embodiment of the invention as a polymer component.

The description given above in connection with the first embodiment of the invention may be applied to the polymer component included in the polymer composition, and additional components (e.g., reinforcing agent, silane coupling agent, compatibilizer, and vulcanizing agent) other than the polymer component.

The polymer composition according to the second embodiment of the invention may be produced by kneading the polymer component, the silica, the crosslinking agent, and an optional component using a kneader such as an open-type kneader (e.g., roll) or an internal mixer (e.g., Banbury mixer). The polymer composition according to the second embodiment of the invention can be applied to various rubber products as a crosslinked polymer by crosslinking (vulcanizing) the polymer composition after molding. For example, the polymer composition may be applied to a tire (e.g., tire tread, undertread, carcass, sidewall, and bead), other industrial products such as a vibration-proof rubber, a fender, a belt, and a hose, and the like. In particular, the polymer composition may preferably be used as a tire tread rubber from the viewpoint of providing low fuel consumption performance.

EXAMPLE 2

The second embodiment of the invention is further described below by way of examples. Note that the invention is not limited to the following examples. In the examples and comparative examples, the unit "parts" refers to "parts by mass", and the unit "%" refers to "mass %", unless otherwise specified. The property values of the modified conjugated diene-based polymer were measured in the same manner as described above in connection with the first embodiment of the invention.

EXAMPLE 1B

Synthesis of modified conjugated diene-based polymer A-2

An autoclave reactor (internal volume: 51) in which the internal atmosphere had been replaced with nitrogen, was charged with 2500 g of cyclohexane (solvent), 2.45 mmol of 2,2-di(2-tetrahydrofuryl)propane (vinyl content modifier (randomizer)), 125 g of styrene (monomer), and 365 g of 1,3-butadiene (monomer). After adjusting the temperature of the mixture contained in the reactor to 10° C., 5.20 mmol of n-butyllithium (initiator) was added to the mixture to initiate polymerization. The polymerization was effected under adiabatic conditions, and the maximum temperature reached 85° C.

When the polymerization conversion rate reached 99% (when 22 minutes had elapsed from the start of polymerization), 10 g of 1,3-butadiene was added to the mixture over 2 minutes, and polymerization was effected for 3 minutes. After the addition of 4.46 mmol of N,N-bis(trimethylsilyl)aminopropylmethyldiethoxysilane (terminal-modifying agent), the mixture was reacted for 15 minutes.

After the addition of 2.2 mmol of titanocene chloride and 4.46 mmol of diisobutylaluminum hydride to the polymer solution, the mixture was reacted at 80° C. for 10 minutes. After the addition of 5.50 g of a silicone fluid "X-22-2000" (manufactured by Shin-Etsu Chemical Co., Ltd.) (main chain-modifying agent), the mixture was reacted for 30 minutes.

After the addition of 2.0 g of 2,6-di-tert-butyl-p-cresol to the polymer solution, the solvent was removed by performing steam stripping using hot water of which the pH was adjusted to 9 using sodium hydroxide to obtain a polymer. The polymer was dried using a heated roll of which the temperature was controlled at 110° C. to obtain a modified conjugated diene-based polymer A-2.

EXAMPLE 2B

Synthesis of Modified Conjugated Diene-Based Polymer B-2

A modified conjugated diene-based polymer B-2 was obtained in the same manner as in Example 1B, except that the amounts of titanocene chloride, diisobutylaluminum hydride, and the silicone fluid "X-22-2000" were changed as shown in Table 5.

EXAMPLE 3B

Synthesis of modified conjugated diene-based polymer C-2

Polymerization was effected in the same manner as in Example 1B, except that the reactor was charged with 8.92 mmol of p-methylstyrene together with 125 g of styrene and 365 g of 1,3-butadiene as a monomer.

When the polymerization conversion rate reached 99% (when 22 minutes had elapsed from the start of polymerization), 10 g of 1,3-butadiene was added to the mixture over 2 minutes, and polymerization was effected for 3 minutes. After the addition of 4.46 mmol of N,N-bis(trimethylsilyl)aminopropylmethyldiethoxysilane, the mixture was reacted for 15 minutes.

After the addition of 8.92 mmol of s-butyllithium and 8.92 mmol of tetramethylethylenediamine to the polymer solution, the mixture was reacted at 80° C. for 15 minutes. After the addition of 11.0 g of the silicone fluid "X-22-2000" (main chain-modifying agent), the mixture was reacted for 30 minutes to obtain a polymer solution including a modified conjugated diene-based polymer. After the addition of 2.0 g of 2,6-di-tert-butyl-p-cresol to the polymer solution, the solvent was removed by performing steam stripping using hot water of which the pH was adjusted to 9 using sodium hydroxide to obtain a polymer. The polymer was dried using a heated roll of which the temperature was controlled at 110° C. to obtain a modified conjugated diene-based polymer C-2.

EXAMPLE 4B

Synthesis of modified conjugated diene-based polymer D-2

A modified conjugated diene-based polymer D-2 was obtained in the same manner as in Example 1B, except that 0.89 mmol of azobisisobutyronitrile was added instead of titanocene chloride and diisobutylaluminum hydride, and 15.3 g of a silicone fluid "X-22-164A" (manufactured by Shin-Etsu Chemical Co., Ltd.) was added as the main chain-modifying agent instead of the silicone fluid "X-22-2000".

EXAMPLE 5B

Synthesis of modified conjugated diene-based polymer E-2

A modified conjugated diene-based polymer E-2 was obtained in the same manner as in Example 2B, except that 4.20 mmol of N-(tert-butyldimethylsilyl)piperazine was added together with the initiator.

EXAMPLE 6B

Synthesis of modified conjugated diene-based polymer F-2

A modified conjugated diene-based polymer F-2 was obtained in the same manner as in Example 2B, except that 10.3 g of a polymer "EPIOL E-1000" (manufactured by NOF Corporation) was added as the main chain-modifying agent instead of the silicone fluid "X-22-2000".

EXAMPLE 7B

Synthesis of modified conjugated diene-based polymer G-2

A modified conjugated diene-based polymer G-2 was obtained in the same manner as in Example 3B, except that 10.3 g of the polymer "EPIOL E-1000" was added as the main chain-modifying agent instead of the silicone fluid "X-22-2000".

EXAMPLE 8B

Synthesis of modified conjugated diene-based polymer H-2

A modified conjugated diene-based polymer H-2 was obtained in the same manner as in Example 2B, except that 8.92 mmol of hexamethylene diisocyanate was added as the main chain-modifying agent instead of the silicone fluid "X-22-2000" (after adding 4.4 mmol of titanocene chloride and 8.92 mmol of diisobutylaluminum hydride, and reacting the mixture at 80° C. for 10 minutes), the mixture was reacted at 80° C. for 15 minutes, followed by the addition of 10.8 g of a polymer "EPOMIN SP-012" (manufactured by Nippon Shokubai Co., Ltd.) to the mixture as the main chain-modifying agent, and the mixture was reacted for 15 minutes.

EXAMPLE 9B

Synthesis of modified conjugated diene-based polymer I-2

A modified conjugated diene-based polymer I-2 was obtained in the same manner as in Example 8B, except that 14.3 g of a silicone fluid "X-22-161A" was added as the main chain-modifying agent instead of the polymer "EPOMIN SP-012".

EXAMPLE 10B

Synthesis of modified conjugated diene-based polymer J-2

A modified conjugated diene-based polymer J-2 was obtained in the same manner as in Example 2B, except that 4.46 mmol of 3-(4-trimethylsilyl-1-piperazino)propyltriethoxysilane was added as the terminal-modifying agent instead of N,N-bis(trimethylsilyl)aminopropylmethyldiethoxysilane, and the mixture was reacted for 15 minutes.

EXAMPLE 11B

Synthesis of modified conjugated diene-based polymer K-2

A modified conjugated diene-based polymer K-2 was obtained in the same manner as in Example 2B, except that 4.46 mmol of 3-(dimethylamino)propyltriethoxysilane was added as the terminal-modifying agent instead of N,N-bis(trimethylsilyl)aminopropylmethyldiethoxysilane, and the mixture was reacted for 15 minutes.

COMPARATIVE EXAMPLE 1B

Synthesis of modified conjugated diene-based polymer L-2

A modified conjugated diene-based polymer L-2 was obtained in the same manner as in Example 1B, except that 2,6-di-tert-butyl-p-cresol was added after the addition of N,N-bis(trimethylsilyl)aminopropylmethyldiethoxysilane without adding titanocene chloride, diisobutylaluminum hydride, and the main chain-modifying agent.

COMPARATIVE EXAMPLE 2B

Synthesis of modified conjugated diene-based polymer M-2

A modified conjugated diene-based polymer M-2 was obtained in the same manner as in Comparative Example 1B, except that 4.20 mmol of N-(tert-butyldimethylsilyl)piperazine was added together with the initiator.

COMPARATIVE EXAMPLE 3B

Synthesis of modified conjugated diene-based polymer N-2

A modified conjugated diene-based polymer N-2 was obtained in the same manner as in Comparative Example 1B, except that 4.46 mmol of 3-(4-trimethylsilyl-1-piperazino)propyltriethoxysilane was added as the terminal-modifying agent instead of N,N-bis(trimethylsilyl)aminopropylmethyldiethoxysilane, and the mixture was reacted for 15 minutes.

COMPARATIVE EXAMPLE 4B

Synthesis of modified conjugated diene-based polymer O-2

A modified conjugated diene-based polymer O-2 was obtained in the same manner as in Comparative Example 1B, except that 4.46 mmol of 3-(dimethylamino)propyltriethoxysilane was added as the terminal-modifying agent instead of N,N-bis(trimethylsilyl)aminopropylmethyldiethoxysilane, and the mixture was reacted for 15 minutes.

COMPARATIVE EXAMPLE 5B

Synthesis of modified conjugated diene-based polymer P-2

An autoclave reactor (internal volume: 51) in which the internal atmosphere had been replaced with nitrogen, was charged with 2500 g of cyclohexane, 2.45 mmol of 2,2-di(2-tetrahydrofuryl)propane, 50 g of styrene, and 150 g of 1,3-butadiene. 5.20 mmol of n-butyllithium was added to the mixture to initiate polymerization. After adjusting the temperature inside the polymerization reactor to 65° C., the mixture was reacted while adding 25 g of styrene and 75 g of 1,3-butadiene over 45 minutes. 4.46 mmol of 1-(4-N,N-dimethylaminophenyl)-1-phenylethylene was added to the mixture when 45 minutes had elapsed from the addition of n-butyllithium, and the mixture was reacted. When 65 minutes had elapsed from the addition of 1-(4-N,N-dimethylaminophenyl)-1-phenylethylene, a copolymerization reaction was effected for 130 minutes while continuously adding 50 g of styrene and 150 g of 1,3-butadiene to the reactor. After the addition of 4.46 mmol of N,N-bis(trimethylsilyl)aminopropylmethyldiethoxysilane, the mixture was reacted for 15 minutes. After the addition of 2.0 g of 2,6-di-tert-butyl-p-cresol to the polymer solution, the solvent was removed by performing steam stripping using hot water of which the pH was adjusted to 9 using sodium hydroxide to obtain a modified conjugated diene-based polymer. The polymer was dried using a heated roll of which the temperature was controlled at 110° C. to obtain a modified conjugated diene-based polymer P-2.

Tables 5 and 6 show the types and the amounts of the components used for polymerization, and the measurement results for the property values of the modified conjugated diene-based polymer.

TABLE 5

|  |  |  | Example 1B | Example 2B | Example 3B | Example 4B | Example 5B | Example 6B | Example 7B | Example 8B |
|---|---|---|---|---|---|---|---|---|---|---|
| Type of modified conjugated diene-based polymer |  |  | Polymer A-2 | Polymer B-2 | Polymer C-2 | Polymer D-2 | Polymer E-2 | Polymer F-2 | Polymer G-2 | Polymer H-2 |
| Component | Solvent |  |  |  |  |  |  |  |  |  |
|  | Cyclohexane | (g) | 2500 | 2500 | 2500 | 2500 | 2500 | 2500 | 2500 | 2500 |
|  | Vinyl content modifier |  |  |  |  |  |  |  |  |  |
|  | Compound V1 | (mmol) | 2.45 | 2.45 | 2.45 | 2.45 | 2.45 | 2.45 | 2.45 | 2.45 |
|  | Monomer |  |  |  |  |  |  |  |  |  |
|  | Styrene | (g) | 125 | 125 | 125 | 125 | 125 | 125 | 125 | 125 |
|  | 1,3-Butadiene | (g) | 365 | 365 | 365 | 365 | 365 | 365 | 365 | 365 |
|  | Additional butadiene | (g) | 10 | 10 | 10 | 10 | 10 | 10 | 10 | 10 |
|  | Additional styrene | (g) | — | — | — | — | — | — | — | — |
|  | p-Methylstyrene | (mmol) | — | — | 8.92 | — | — | — | 8.92 | — |
|  | Compound M1 | (mmol) | — | — | — | — | — | — | — | — |
|  | Initiator |  |  |  |  |  |  |  |  |  |
|  | n-Butyllithium | (mmol) | 5.20 | 5.20 | 5.20 | 5.20 | 5.20 | 5.20 | 5.20 | 5.20 |
|  | N-substituted piperazine | (mmol) | — | — | — | — | 4.20 | — | — | — |
|  | Terminal-modifying agent |  |  |  |  |  |  |  |  |  |
|  | Compound (B2-1) | (mmol) | 4.46 | 4.46 | 4.46 | 4.46 | 4.46 | 4.46 | 4.46 | 4.46 |
|  | Compound (B2-2) | (mmol) | — | — | — | — | — | — | — | — |
|  | Compound (B2-3) | (mmol) | — | — | — | — | — | — | — | — |
|  | Reaction initiator |  |  |  |  |  |  |  |  |  |
|  | Titanocene chloride | (mmol) | 2.20 | 4.40 | — | — | 4.40 | 4.40 | — | 4.40 |
|  | Compound C1 | (mmol) | 4.46 | 8.92 | — | — | 8.92 | 8.92 | — | 8.92 |
|  | s-Butyllithium | (mmol) | — | — | 8.92 | — | — | — | 8.92 | — |
|  | Compound C2 | (mmol) | — | — | 8.92 | — | — | — | 8.92 | — |
|  | Compound C3 | (mmol) | — | — | — | 0.89 | — | — | — | — |
|  | Main chain-modifying agent |  |  |  |  |  |  |  |  |  |
|  | X-22-2000 | (g) | 5.50 | 11.0 | 11.0 | — | 11.0 | — | — | — |
|  | X-22-164A | (g) | — | — | — | 15.3 | — | — | — | — |
|  | EPIOL E-1000 | (g) | — | — | — | — | — | 10.3 | 10.3 | — |
|  | Isocyanate E2 | (mmol) | — | — | — | — | — | — | — | 8.92 |
|  | EPOMIN SP-012 | (g) | — | — | — | — | — | — | — | 10.8 |
|  | X-22-161A | (g) | — | — | — | — | — | — | — | — |
| Analytical value | Bound styrene content | [%] | 25 | 25 | 25 | 25 | 25 | 25 | 25 | 25 |
|  | Vinyl content | [%] | 55 | 55 | 55 | 55 | 56 | 55 | 55 | 55 |
|  | Weight average molecular weight (before modification) | [×10$^4$] | 21 | 20 | 20 | 21 | 21 | 20 | 21 | 20 |

TABLE 6

|  |  |  | Example 9B | Example 10B | Example 11B | Comparative Example 1B | Comparative Example 2B | Comparative Example 3B | Comparative Example 4B | Comparative Example 5B |
|---|---|---|---|---|---|---|---|---|---|---|
| Type of modified conjugated diene-based polymer |  |  | Polymer I-2 | Polymer J-2 | Polymer K-2 | Polymer L-2 | Polymer M-2 | Polymer N-2 | Polymer O-2 | Polymer P-2 |
| Component | Solvent |  |  |  |  |  |  |  |  |  |
|  | Cyclohexane | (g) | 2500 | 2500 | 2500 | 2500 | 2500 | 2500 | 2500 | 2500 |
|  | Vinyl content modifier |  |  |  |  |  |  |  |  |  |
|  | Compound V1 | (mmol) | 2.45 | 2.45 | 2.45 | 2.45 | 2.45 | 2.45 | 2.45 | 2.45 |
|  | Monomer |  |  |  |  |  |  |  |  |  |
|  | Styrene | (g) | 125 | 125 | 125 | 125 | 125 | 125 | 125 | 50 |
|  | 1,3-Butadiene | (g) | 365 | 365 | 365 | 365 | 365 | 365 | 365 | 150 |
|  | Additional butadiene | (g) | 10 | 10 | 10 | 10 | 10 | 10 | 10 | 225 |
|  | Additional styrene | (g) | — | — | — | — | — | — | — | 75 |
|  | p-Methylstyrene | (mmol) | — | — | — | — | — | — | — | — |
|  | Compound M1 | (mmol) | — | — | — | — | — | — | — | 4.46 |
|  | Initiator |  |  |  |  |  |  |  |  |  |
|  | n-Butyllithium | (mmol) | 5.20 | 5.20 | 5.20 | 5.20 | 5.20 | 5.20 | 5.20 | 5.20 |
|  | N-substituted piperazine | (mmol) | — | — | — | — | — | — | — | — |
|  | Terminal-modifying agent |  |  |  |  |  |  |  |  |  |
|  | Compound (B2-1) | (mmol) | 4.46 | — | — | 4.46 | 4.46 | — | — | 4.46 |
|  | Compound (B2-2) | (mmol) | — | 4.46 | — | — | — | 4.46 | — | — |
|  | Compound (B2-3) | (mmol) | — | — | 4.46 | — | — | — | 4.46 | — |
|  | Reaction initiator |  |  |  |  |  |  |  |  |  |
|  | Titanocene chloride | (mmol) | 4.40 | 4.40 | 4.40 | — | — | — | — | — |
|  | Compound C1 | (mmol) | 8.92 | 8.92 | 8.92 | — | — | — | — | — |
|  | s-Butyllithium | (mmol) | — | — | — | — | — | — | — | — |
|  | Compound C2 | (mmol) | — | — | — | — | — | — | — | — |

TABLE 6-continued

| | | | Example 9B | Example 10B | Example 11B | Comparative Example 1B | Comparative Example 2B | Comparative Example 3B | Comparative Example 4B | Comparative Example 5B |
|---|---|---|---|---|---|---|---|---|---|---|
| | Compound C3 | (mmol) | — | — | — | — | — | — | — | — |
| | Main chain-modifying agent | | | | | | | | | |
| | X-22-2000 | (g) | — | 11.0 | 11.0 | — | — | — | — | — |
| | X-22-164A | (g) | — | — | — | — | — | — | — | — |
| | EPIOL E-1000 | (g) | — | — | — | — | — | — | — | — |
| | Isocyanate E2 | (mmol) | 8.92 | — | — | — | — | — | — | — |
| | EPOMIN SP-012 | (g) | — | — | — | — | — | — | — | — |
| | X-22-161A | (g) | 14.3 | — | — | — | — | — | — | — |
| Analytical value | Bound styrene content | [%] | 25 | 25 | 25 | 25 | 25 | 25 | 25 | 25 |
| | Vinyl content | [%] | 55 | 54 | 56 | 55 | 56 | 51 | 56 | 53 |
| | Weight average molecular weight (before modification) | [×10$^4$] | 21 | 20 | 20 | 20 | 21 | 21 | 20 | 22 |

The details of the compounds in Tables 5 and 6 are shown below.
Compound V1: 2,2-di(2-tetrahydrofuryl)propane
Compound M1: 1-(4-N,N-dimethylaminophenyl)-1-phenylethylene
N-substituted piperazine: N-(tert-butyldimethylsilyl)piperazine
Compound (B2-1): N,N-bis(trimethylsilyl)aminopropylmethyldiethoxysilane
Compound (B2-2): 3-(4-trimethylsilyl-1-piperazino)propyltriethoxysilane
Compound (B2-3): 3-(dimethylamino)propyltriethoxysilane
Compound C1: diisobutylaluminum hydride
Compound C2: tetramethylethylenediamine
Compound C3: azobisisobutyronitrile
Isocyanate E2: hexamethylene diisocyanate
Production of polymer composition and crosslinked polymer

EXAMPLE 1B-1

The modified conjugated diene-based polymer A-2 and the components shown in Table 7 were mixed, and kneaded to produce a polymer composition. The components were kneaded as described below. Specifically, the modified conjugated diene-based polymer A-2, the polybutadiene rubber, the extender oil, silica, carbon black, the silane coupling agent, stearic acid, the aging preventive, and zinc oxide were mixed, and kneaded using a plastomill (internal volume: 250 ml) equipped with a temperature controller at a filling rate of 72% and a rotational speed of 60 rpm (first-step kneading). After cooling the mixture to room temperature, sulfur and the vulcanization accelerator were added to the mixture, and the mixture was kneaded (second-step kneading). The mixture was then molded, and vulcanized at 160° C. for a given time using a vulcanizing press to obtain a crosslinked polymer (vulcanized polymer).

EXAMPLES 2B-1 to 11B-1

A polymer composition and a crosslinked polymer were produced in the same manner as in Example 1B-1, except that the type of the modified conjugated diene-based polymer was changed as shown in Tables 7 and 8.

COMPARATIVE EXAMPLES 1B-1 to 10B-1

A polymer composition and a crosslinked polymer were produced in the same manner as in Example 1B-1, except that the type of the modified conjugated diene-based polymer was changed as shown in Tables 7 and 8, and the additives shown in Tables 7 and 8 were used in the amounts shown in Tables 7 and 8. Note that the polymer composition was produced so that the total amount of the modified conjugated diene-based polymer, the polybutadiene rubber, and the additives was 100 parts by mass.

TABLE 7

| Component | | | Comparative Example 1B-1 | Example 1B-1 | Comparative Example 2B-1 | Example 2B-1 | Example 3B-1 | Example 4B-1 |
|---|---|---|---|---|---|---|---|---|
| Modified conjugated diene-based polymer | | Type | Polymer L-2 | Polymer A-2 | Polymer L-2 | Polymer B-2 | Polymer C-2 | Polymer D-2 |
| | | (PHR) | 70 | 70 | 66.15 | 70 | 70 | 70 |
| Polybutadiene rubber | *1 | (PHR) | 30 | 30 | 30 | 30 | 30 | 30 |
| Extender oil | *2 | (PHR) | 37.5 | 37.5 | 37.5 | 37.5 | 37.5 | 37.5 |
| Silica | *3 | (PHR) | 70 | 70 | 70 | 70 | 70 | 70 |
| Carbon black | *4 | (PHR) | 5.6 | 5.6 | 5.6 | 5.6 | 5.6 | 5.6 |
| Silane coupling agent | *5 | (PHR) | 5.6 | 5.6 | 5.6 | 5.6 | 5.6 | 5.6 |
| Stearic acid | | (PHR) | 2 | 2 | 2 | 2 | 2 | 2 |
| Aging preventive | *6 | (PHR) | 1 | 1 | 1 | 1 | 1 | 1 |
| Zinc oxide | | (PHR) | 3 | 3 | 3 | 3 | 3 | 3 |
| Vulcanization accelerator D | *7 | (PHR) | 1.5 | 1.5 | 1.5 | 1.5 | 1.5 | 1.5 |
| Vulcanization accelerator CZ | *8 | (PHR) | 1.8 | 1.8 | 1.8 | 1.8 | 1.8 | 1.8 |
| Sulfur | | (PHR) | 1.5 | 1.5 | 1.5 | 1.5 | 1.5 | 1.5 |
| Additive | X-22-2000 | (PHR) | — | — | 3.85 | — | — | — |
| | X-22-164A | (PHR) | — | — | — | — | — | — |
| | EPIOL E-1000 | (PHR) | — | — | — | — | — | — |
| | EPOMIN SP-012 | (PHR) | — | — | — | — | — | — |
| | X-22-161A | (PHR) | — | — | — | — | — | — |

TABLE 7-continued

| Properties | | | | | | | |
|---|---|---|---|---|---|---|---|
| Comp'dMV(INDEX) | | 100 | 110 | 110 | 120 | 120 | 120 |
| 70° C. tanδ(INDEX) | | 100 | 113 | 110 | 120 | 120 | 120 |
| DIN abrasion(INDEX) | | 100 | 105 | 93 | 102 | 102 | 102 |

| | | | Comparative Example 3B-1 | Example 5B-1 | Comparative Example 4B-1 | Example 6B-1 | Example 7B-1 | Comparative Example 5B-1 |
|---|---|---|---|---|---|---|---|---|
| Modified conjugated diene-based polymer | | Type | Polymer L-2 | Polymer E-2 | Polymer M-2 | Polymer F-2 | Polymer G-2 | Polymer L-2 |
| | | (PHR) | 62.3 | 70 | 62.3 | 70 | 70 | 62.79 |
| Polybutadiene rubber | *1 | (PHR) | 30 | 30 | 30 | 30 | 30 | 30 |
| Extender oil | *2 | (PHR) | 37.5 | 37.5 | 37.5 | 37.5 | 37.5 | 37.5 |
| Silica | *3 | (PHR) | 70 | 70 | 70 | 70 | 70 | 70 |
| Carbon black | *4 | (PHR) | 5.6 | 5.6 | 5.6 | 5.6 | 5.6 | 5.6 |
| Silane coupling agent | *5 | (PHR) | 5.6 | 5.6 | 5.6 | 5.6 | 5.6 | 5.6 |
| Stearic acid | | (PHR) | 2 | 2 | 2 | 2 | 2 | 2 |
| Aging preventive | *6 | (PHR) | 1 | 1 | 1 | 1 | 1 | 1 |
| Zinc oxide | | (PHR) | 3 | 3 | 3 | 3 | 3 | 3 |
| Vulcanization accelerator D | *7 | (PHR) | 1.5 | 1.5 | 1.5 | 1.5 | 1.5 | 1.5 |
| Vulcanization accelerator CZ | *8 | (PHR) | 1.8 | 1.8 | 1.8 | 1.8 | 1.8 | 1.8 |
| Sulfur | | (PHR) | 1.5 | 1.5 | 1.5 | 1.5 | 1.5 | 1.5 |
| Additive | X-22-2000 | (PHR) | 7.70 | — | 7.70 | — | — | — |
| | X-22-164A | (PHR) | — | — | — | — | — | — |
| | EPIOL E-1000 | (PHR) | — | — | — | — | — | 7.21 |
| | EPOMIN SP-012 | (PHR) | — | — | — | — | — | — |
| | X-22-161A | (PHR) | — | — | — | — | — | — |
| Properties | | | | | | | | |
| Comp'dMV(INDEX) | | | 120 | 105 | 105 | 120 | 120 | 120 |
| 70° C. tanδ(INDEX) | | | 117 | 129 | 122 | 124 | 124 | 120 |
| DIN abrasion(INDEX) | | | 85 | 108 | 92 | 100 | 100 | 82 |

TABLE 8

| Component | | | Example 8B-1 | Comparative Example 6B-1 | Example 9B-1 | Comparative Example 7B-1 | Example 10B-1 | Comparative Example 8B-1 | Example 11B-1 | Comparative Example 9B-1 | Comparative Example 10B-1 |
|---|---|---|---|---|---|---|---|---|---|---|---|
| Modified conjugated diene-based polymer | | Type | Polymer H-2 | Polymer L-2 | Polymer I-2 | Polymer L-2 | Polymer J-2 | Polymer N-2 | Polymer K-2 | Polymer O-2 | Polymer P-2 |
| | | (PHR) | 70 | 62.44 | 70 | 60 | 70 | 62.3 | 70 | 62.3 | 70 |
| Polybutadiene rubber | *1 | (PHR) | 30 | 30 | 30 | 30 | 30 | 30 | 30 | 30 | 30 |
| Extender oil | *2 | (PHR) | 37.5 | 37.5 | 37.5 | 37.5 | 37.5 | 37.5 | 37.5 | 37.5 | 37.5 |
| Silica | *3 | (PHR) | 70 | 70 | 70 | 70 | 70 | 70 | 70 | 70 | 70 |
| Carbon black | *4 | (PHR) | 5.6 | 5.6 | 5.6 | 5.6 | 5.6 | 5.6 | 5.6 | 5.6 | 5.6 |
| Silane coupling agent | *5 | (PHR) | 5.6 | 5.6 | 5.6 | 5.6 | 5.6 | 5.6 | 5.6 | 5.6 | 5.6 |
| Stearic acid | | (PHR) | 2 | 2 | 2 | 2 | 2 | 2 | 2 | 2 | 2 |
| Aging preventive | *6 | (PHR) | 1 | 1 | 1 | 1 | 1 | 1 | 1 | 1 | 1 |
| Zinc oxide | | (PHR) | 3 | 3 | 3 | 3 | 3 | 3 | 3 | 3 | 3 |
| Vulcanization accelerator D | *7 | (PHR) | 1.5 | 1.5 | 1.5 | 1.5 | 1.5 | 1.5 | 1.5 | 1.5 | 1.5 |
| Vulcanization accelerator CZ | *8 | (PHR) | 1.8 | 1.8 | 1.8 | 1.8 | 1.8 | 1.8 | 1.8 | 1.8 | 1.8 |
| Sulfur | | (PHR) | 1.5 | 1.5 | 1.5 | 1.5 | 1.5 | 1.5 | 1.5 | 1.5 | 1.5 |
| Additive | X-22-2000 | (PHR) | — | — | — | — | — | 7.70 | — | 7.70 | — |
| | X-22-164A | (PHR) | — | — | — | — | — | — | — | — | — |
| | EPIOL E-1000 | (PHR) | — | — | — | — | — | — | — | — | — |
| | EPOMIN SP-012 | (PHR) | — | 7.56 | — | — | — | — | — | — | — |
| | X-22-161A | (PHR) | — | — | — | 10.0 | — | — | — | — | — |
| Comp'dMV(INDEX) | | | 115 | 115 | 120 | 120 | 120 | 120 | 120 | 120 | 85 |
| 70° C. tanδ(INDEX) | | | 117 | 113 | 122 | 118 | 118 | 115 | 117 | 114 | 116 |
| DIN abrasion(INDEX) | | | 110 | 92 | 104 | 87 | 99 | 83 | 97 | 82 | 105 |

The details of each component in Tables 7 and 8 are shown below. *1: BR01 manufactured by JSR Corporation, *2: JOMO Process NC-140 manufactured by Japan Energy Corporation, *3: ZEOSIL 1165MP manufactured by Rhodia, *4: DIABLACK N339 manufactured by Mitsubishi Chemical Corporation, *5: Si75 manufactured by Evonik, *6: OZONONE 6C manufactured by Seiko Chemical Co., Ltd., *7: NOCCELER D manufactured by Ouchi Shinko Chemical Industrial Co., Ltd., *8: NOCCELER CZ manufactured by Ouchi Shinko Chemical Industrial Co., Ltd.

Evaluation of Tire Performance

The properties (tire performance) of the polymer compositions and the crosslinked polymers of Examples 1B-1 to 11B-1 and Comparative Examples 1B-1 to 10B-1 were evaluated as described below. The evaluation results are shown in Tables 7 and 8.

(1) Mooney Viscosity (Comp'dMV)

The polymer composition that was not vulcanized was used as a measurement specimen. The Mooney viscosity of the measurement specimen was measured in accordance with JIS K 6300-1 using an L rotor (preheating time: 1 minute, rotor operation time: 4 minutes, temperature: 100° C.). The Mooney viscosity is indicated as an index relative to the value (=100) of Comparative Example 1B-1. A larger index value indicates better processability.

(2) 70° C. tan δ

The crosslinked polymer was used as a measurement specimen, and the loss tangent 70° C. tan δ of the measurement specimen was measured using a rheometer "ARES-RDA" (manufactured by TA Instruments) at a shear strain of 1.0%, an angular velocity of 100 rad/s, and a temperature of 70° C. The loss tangent 70° C. tan δ is indicated as an index relative to the value (=100) of Comparative Example 1B-1. A larger index value indicates a smaller energy loss and better low hysteresis loss properties.

(3) Abrasion Resistance

The crosslinked polymer was used as a measurement specimen. The DIN abrasion of the measurement specimen was measured in accordance with JIS K 6264-2 using a DIN abrasion tester (manufactured by Toyo Seiki Seisaku-Sho, Ltd.) (load: 10 N, temperature: 25° C.). The measurement results are indicated as an index relative to the value (=100) of Comparative Example 1B-1. A larger index value indicates better abrasion resistance.

As shown in Tables 7 and 8, good processability, good low hysteresis loss properties, and good abrasion resistance were achieved when using the polymer compositions or the crosslinked polymers of Examples 1B-1 to 5B-1, 8B-1, and 9B-1 as compared with the case of using the polymer composition or the crosslinked polymer of Comparative Example 1B-1. The abrasion resistance achieved when using the polymer compositions or the crosslinked polymers of Examples 6B-1, 7B-1, 10B-1, and 11B-1 was almost equal to that achieved when using the polymer composition or the crosslinked polymer of Comparative Example 1B-1. However, good processability and good low hysteresis loss properties were achieved when using the polymer compositions or the crosslinked polymers of Examples 6B-1, 7B-1, 10B-1, and 11B-1 as compared with the case of using the polymer composition or the crosslinked polymer of Comparative Example 1B-1. It was confirmed from these results that the polymer compositions and the crosslinked polymers of Examples 1B-1 to 11B-1 exhibited processability, low hysteresis loss properties, and abrasion resistance in a well-balanced manner. On the other hand, the polymer compositions and the crosslinked polymers of Comparative Examples 2B-1 to 10B-1 were inferior to the polymer compositions and the crosslinked polymers of Examples 1B-1 to 11B-1 in at least one of processability, low hysteresis loss properties, and abrasion resistance.

EXAMPLE 12B

Synthesis of modified conjugated diene-based polymer Q-2

An autoclave reactor (internal volume: 5l) in which the internal atmosphere had been replaced with nitrogen, was charged with 3500 g of cyclohexane (solvent), 2.45 mmol of 2,2-di(2-tetrahydrofuryl)propane (compound V1), and 500 g of 1,3-butadiene (monomer). After adjusting the temperature of the mixture contained in the reactor to 40° C., 5.46 mmol of n-butyllithium (initiator) was added to the mixture to initiate polymerization. The polymerization was effected under adiabatic conditions, and the maximum temperature reached 90° C. When the polymerization conversion rate reached 99%, 5.13 mmol of N,N-bis(trimethylsilyl)aminopropylmethyldiethoxysilane (aminosilane A) was added to the mixture as a terminal-modifying agent, and the mixture was reacted for 15 minutes.

After the addition of 2.20 mmol of titanocene chloride and 4.46 mmol of diisobutylaluminum hydride (compound C1) to the polymer solution, the mixture was reacted at 80° C. for 10 minutes. After the addition of 5.50 g of a silicone fluid "X-22-2000" (manufactured by Shin-Etsu Chemical Co., Ltd.) (main chain-modifying agent), the mixture was reacted for 30 minutes.

After the addition of 2.0 g of 2,6-di-tert-butyl-p-cresol to the polymer solution, the solvent was removed by performing steam stripping using hot water of which the pH was adjusted to 9 using sodium hydroxide to obtain a polymer. The polymer was dried using a heated roll of which the temperature was controlled at 110° C. to obtain a modified conjugated diene-based polymer Q-2.

COMPARATIVE EXAMPLE 6B

Synthesis of modified conjugated diene-based polymer R-2

A modified conjugated diene-based polymer R-2 was obtained in the same manner as in Example 12B, except that 2,6-di-tert-butyl-p-cresol was added after the addition of N,N-bis(trimethylsilyl)aminopropylmethyldiethoxysilane without adding titanocene chloride, diisobutylaluminum hydride, and the main chain-modifying agent.

Production and evaluation of polymer composition and crosslinked polymer

EXAMPLE 12B-1 and COMPARATIVE EXAMPLE 6B-1

A polymer composition and a crosslinked polymer were produced in the same manner as in Example 1B-1, except that the polymers Q-2 and R-2 were respectively used as the modified conjugated diene-based polymer. The tire performance was evaluated using the resulting polymer composition and crosslinked polymer. The results are shown in Table 9. The measurement results for the Mooney viscosity, the loss tangent 70° C. tan δ, and the DIN abrasion are indicated as an index relative to the value (=100) of Comparative Example 6B-1. Table 9 also shows the types and the amounts of the components used to produce the polymers Q-2 and R-2.

TABLE 9

| | | | Example 12B | Comparative Example 6B |
|---|---|---|---|---|
| Type of modified conjugated diene-based polymer | | | Polymer Q-2 | Polymer R-2 |
| Component | Solvent | | | |
| | Cyclohexane | (g) | 3500 | 3500 |
| | Vinyl content modifier | | | |
| | Compound V1 | (mmol) | 0.47 | 0.47 |
| | Monomer | | | |
| | Styrene | (g) | — | — |
| | 1,3-Butadiene | (g) | 500 | 500 |
| | Initiator | | | |
| | n-Butyllithium | (mmol) | 5.20 | 5.20 |
| | Terminal-modifying agent | | | |

TABLE 9-continued

| | | | Example 12B | Comparative Example 6B |
|---|---|---|---|---|
| | Compound (B2-1) Reaction initiator | (mmol) | 4.46 | 4.46 |
| | Titanocene chloride | (mmol) | 2.20 | — |
| | Compound C1 Main chain-modifying agent | (mmol) | 4.46 | — |
| | X-22-2000 | (g) | 5.50 | — |
| Analytical value | Bound styrene content | [%] | — | — |
| | Vinyl content | [%] | 30 | 30 |
| | Weight average molecular weight (before modification) | [×10⁴] | 20 | 20 |
| Properties | Comp'dMV (INDEX) | | 110 | 100 |
| | 70° C. tanδ(INDEX) | | 116 | 100 |
| | DIN abrasion (INDEX) | | 105 | 100 |

As shown in Table 9, good processability, good low hysteresis loss properties, and good abrasion resistance were achieved when using the polymer composition or the cross-linked polymer of Example 12B-1 as compared with the case of using the polymer composition or the crosslinked polymer of Comparative Example 6B-1.

The invention claimed is:

1. A method for producing a modified conjugated diene-based polymer, wherein the modified conjugated diene-based polymer is a modified product of a conjugated diene-based polymer obtained by polymerizing a conjugated diene compound, or by polymerizing a conjugated diene compound and an aromatic vinyl compound, in the presence of an alkali metal compound or an alkaline-earth metal compound, the method comprising:
performing a terminal modification that reacts an active terminal of the conjugated diene-based polymer with a compound (A1) comprising a functional group that interacts with silica to obtain the terminal-modified polymer,
wherein the compound (A1) is at least one compound selected from the group consisting of (I) a compound (a-1) of formula (1), (II) a compound (a-2) comprising a functional group (x1)and a group (x2) in its molecule, the functional group (x1) being at least one functional group selected from the group consisting of a cyclic ether group and a (thio)carbonyl group, and the group (x2) comprising at least one atom selected from the group consisting of a nitrogen atom, a phosphorus atom, an oxygen atom, and a sulfur atom, and not comprising active hydrogen, the group (x2) differing from the functional group (x1), and (III) a compound (a-3) comprising two or more iso (thio)cyanate groups in its molecule,

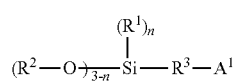
(1)

wherein $A^1$ is a monovalent functional group comprising at least one atom selected from the group consisting of a nitrogen atom, a phosphorus atom, and a sulfur atom, and does not comprise active hydrogen, the monovalent functional group being bonded to $R^3$ through a nitrogen atom, a phosphorus atom, or a sulfur atom, $R^1$ and $R^2$ are each independently a hydrocarbyl group,
$R^3$ is a hydrocarbylene group, and
n is an integer from 0 to 2,
provided that a lurality of $R^1$ are either identical or different when a plurality of $R^1$ are present, and a plurality of $R^2$ are either identical or different when a plurality of $R^2$ are present; and modifying a main chain of the terminal-modified polymer by reacting at least either an unsaturated bond or a functional group that is comprised in the terminal-modified polymer and is not situated at a terminal of the terminal-modified polymer, with a specific compound that comprises a functional group that interacts with silica, wherein the specific compound is a polymer (P) comprising a repeating unit (p), the repeating unit (p) comprising at least one atom selected from the group consisting of a nitrogen atom, an oxygen atom, a phosphorus atom, and a sulfur atom.

2. The method according to claim 1, wherein a degree of polymerization of the repeating unit (p) in the polymer (P) is from 5 to 200.

3. The method according to claim 1, wherein the polymer (P) comprises at least one structure selected from the group consisting of a polysiloxane structure, a polyether structure, and a polyimine structure.

4. The method according to claim 1, wherein the repeating unit (p) is of formula (p-1) or a formula (p-2),

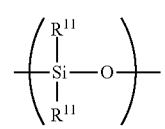
(p-1)

wherein $R^{11}$ is a hydrogen atom, a hydrocarbyl group having 1 to 10 carbon atoms, an alkoxy group having 1 to 10 carbon atoms, an amino group, a hydroxyl group, or an ester group, provided that the hydrocarbyl group having 1 to 10 carbon atoms optionally comprises at least one substituent selected from the group consisting of an epoxy group, an amino group, a carboxyl group, a hydroxyl group, and a mercapto group, and optionally comprises "—O—" or "—COO—" between carbon atoms, $R^{11}$ comprised in an identical repeating unit are either identical or different, and $R^{11}$ comprised in different repeating units are either identical or different,

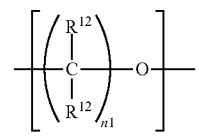
(p-2)

wherein $R^{12}$ is a hydrogen atom, a hydrocarbyl group having 1 to 10 carbon atoms, an alkoxy group having 1 to 10 carbon atoms, an amino group, a hydroxyl group, or an ester group, provided that the hydrocarbyl group having 1 to 10 carbon atoms optionally comprises at least one substituent selected from the group consisting of an epoxy group, an amino group, a carboxyl group, a hydroxyl group, and a mercapto group, and optionally comprises "—O—" or "—COO—" between carbon atoms, and n1 is an integer from 1 to 10, provided that $R^{12}$ comprised in an identical repeating unit are either identical or different, $R^{12}$ comprised in different repeating units are either identical or different, and n1 are either identical or different between different repeating units.

5. The method according to claim 1,
wherein the compound (A1) is of formula (1),

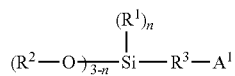
(1)

wherein $A^1$ is a monovalent functional group comprising at least one atom selected from the group consisting of a nitrogen atom, a phosphorus atom, and a sulfur atom, and does not comprise active hydrogen, the monovalent functional group being bonded to $R^3$ through a nitrogen atom, a phosphorus atom, or a sulfur atom, $R^1$ and $R^2$ are each independently a hydrocarbyl group,
$R^3$ is a hydrocarbylene group, and
n is an integer from 0 to 2,
provided that a plurality of $R^1$ are either identical or different when a plurality of $R^1$ are present, and a plurality of $R^2$ are either identical or different when a plurality of $R^2$ are present.

6. A polymer composition, comprising a modified conjugated diene-based polymer obtained by the method according to claim 1, silica, and a crosslinking agent.

7. A crosslinked polymer, obtained by crosslinking the polymer composition according to claim 6.

8. A tire, obtained by employing the crosslinked polymer according to claim 7 as a tread material, a sidewall material, or both.

\* \* \* \* \*